United States Patent
Tadesse et al.

(10) Patent No.: US 12,474,893 B2
(45) Date of Patent: Nov. 18, 2025

(54) INTEGRATED APPLICATION PLATFORM TO IMPLEMENT WIDGETS

(71) Applicant: Figma, Inc., San Francisco, CA (US)

(72) Inventors: Bersabel Tadesse, San Francisco, CA (US); Jonas Sicking, San Francisco, CA (US); Michael Yong, San Francisco, CA (US); Sawyer Hood, San Francisco, CA (US); Yi Tang Jackie Chui, San Francisco, CA (US); Rohit Chouhan, San Francisco, CA (US)

(73) Assignee: Figma, Inc., San Francisco, CA (US)

( * ) Notice: Subject to any disclaimer, the term of this patent is extended or adjusted under 35 U.S.C. 154(b) by 40 days.

(21) Appl. No.: 17/894,961

(22) Filed: Aug. 24, 2022

(65) Prior Publication Data

US 2023/0068410 A1    Mar. 2, 2023

Related U.S. Application Data

(60) Provisional application No. 63/236,645, filed on Aug. 24, 2021.

(51) Int. Cl.
*G06F 8/34* (2018.01)
*G06F 8/38* (2018.01)

(52) U.S. Cl.
CPC . *G06F 8/34* (2013.01); *G06F 8/38* (2013.01)

(58) Field of Classification Search
CPC .................................. G06F 8/34; G06F 8/38
USPC ....................................................... 717/109
See application file for complete search history.

(56) References Cited

U.S. PATENT DOCUMENTS

| | | |
|---|---|---|
| 5,339,389 A | 8/1994 | Bates |
| 7,770,122 B1 | 8/2010 | Shaik |
| 9,424,545 B1 | 8/2016 | Lee |
| 9,430,229 B1 | 8/2016 | Zijst |
| 10,606,576 B1 | 3/2020 | Tung |
| 10,620,921 B2 | 4/2020 | Brebner |
| 11,138,518 B1 * | 10/2021 | Yu ...................... G06F 9/44526 |
| 12,107,816 B2 * | 10/2024 | Leigh ...................... H04L 51/18 |
| 2008/0040426 A1 | 2/2008 | Synstelien |
| 2008/0082691 A1 * | 4/2008 | Hochwarth ........ H04N 21/8545 709/231 |
| 2010/0192107 A1 | 7/2010 | Takahashi |
| 2010/0306181 A1 * | 12/2010 | Little ...................... G06F 9/466 711/E12.001 |

(Continued)

OTHER PUBLICATIONS

Paper by WeTransfer—Simple Sketch App, "Creativity at your fingertips" URL:https://web.archive.org/web/20220121205009/https://wetransfer.com/paper, 9 pages.

(Continued)

*Primary Examiner* — Bradley A Teets
*Assistant Examiner* — Zengpu Wei
(74) *Attorney, Agent, or Firm* — Squire Patton Boggs LLP; Sarah Mirza

(57) ABSTRACT

An integrated application platform enables users to select and implement widgets, in order to insert widget objects with rendered content. The widget objects are persistent content elements that are dynamically responsive to user input. Further, the widget objects are associated with functionality that extends or supplements the functionality provided by the integrated application platform.

19 Claims, 8 Drawing Sheets

(56) References Cited

U.S. PATENT DOCUMENTS

| | | | |
|---|---|---|---|
| 2011/0113350 A1* | 5/2011 | Carlos | H04L 63/10 715/753 |
| 2011/0268262 A1 | 11/2011 | Jones | |
| 2013/0111338 A1 | 5/2013 | Huo | |
| 2014/0310660 A1 | 10/2014 | Rosen | |
| 2015/0127753 A1 | 5/2015 | Tew | |
| 2016/0321449 A1 | 11/2016 | Surti | |
| 2017/0052767 A1 | 2/2017 | Bennett | |
| 2017/0109139 A1 | 4/2017 | Bitner | |
| 2017/0192656 A1 | 7/2017 | Pedrick | |
| 2017/0262294 A1 | 9/2017 | Yakan | |
| 2017/0339370 A1 | 11/2017 | Inoue | |
| 2018/0088915 A1 | 3/2018 | Yang et al. | |
| 2018/0181299 A1 | 6/2018 | Ouellette et al. | |
| 2018/0285084 A1 | 10/2018 | Mimlitch, III | |
| 2019/0065440 A1 | 2/2019 | Lu et al. | |
| 2019/0146811 A1 | 5/2019 | Pell | |
| 2019/0179501 A1 | 6/2019 | Seeley | |
| 2019/0236975 A1 | 8/2019 | Chong | |
| 2019/0238602 A1 | 8/2019 | Lo | |
| 2019/0300475 A1 | 10/2019 | Li et al. | |
| 2019/0303880 A1 | 10/2019 | Hashimoto | |
| 2019/0361580 A1 | 11/2019 | Dowling et al. | |
| 2020/0042648 A1 | 2/2020 | Rao | |
| 2020/0050431 A1 | 2/2020 | Zilouchian Moghaddam | |
| 2020/0296147 A1 | 9/2020 | Eliason | |
| 2021/0208775 A1 | 7/2021 | Allington | |
| 2021/0247967 A1 | 8/2021 | Wichary et al. | |
| 2021/0367986 A1 | 11/2021 | Davuluri et al. | |
| 2022/0108276 A1 | 4/2022 | Stringham | |
| 2022/0129118 A1* | 4/2022 | Hsu | G06F 3/0482 |
| 2022/0263675 A1 | 8/2022 | Cupala | |
| 2022/0334704 A1 | 10/2022 | Lin | |
| 2022/0334806 A1 | 10/2022 | Lin | |
| 2022/0342644 A1 | 10/2022 | Fuetsch | |

OTHER PUBLICATIONS

International Search Report and the Written Opinion of the International Searching Authority mailed Nov. 28, 2022, for related PCT/US2022/040461 filed Aug. 16, 2022, 14 pages.

International Search Report and the Written Opinion of the International Searching Authority mailed Dec. 12, 2022, for related PCT/US2022/041418 filed Aug. 24, 2022, 11 pages.

"Zack Qattan, "Collaborative Cursor Chat w/Croquet", Nov. 30, 2020, youtube.com, https://www.youtube.com/watch?v=NiqTCROdlgw, pp. 1-15 (Year: 2020)".

Anonymous: "HTML editor—Wikipedia". Apr. 13, 2022 pp. 1-4.

Anonymous: "Change cursor into custom text", Dec. 24, 2018 (Dec. 24, 2018), XP055930588, Retrieved from the Internet: URL: https://stackoverflow.com/questions/53916492/change-cursor-into-custome-text [retrieved on Jun. 13, 2022] the whole document, 2 pages.

International Search Report and the Written Opinion of the International Searching Authority mailed Feb. 1, 2023, for related PCT/US2022/047191 filed Oct. 19, 2022, 16 pages.

International Search Report and the Written Opinion of the International Searching Authority mailed Jul. 1, 2022, for related PCT/US2022/025626, filed Apr. 20, 2022, 17 pages.

International Search Report and Written Opinion mailed Jun. 27, 2023 in PCT/US2023/015322.

International Search Report dated Aug. 18, 2023 in PCT/US2023/020890.

IPRP dated Jul. 3, 2024 in PCT/US2023/020890.

IPRP mailed May 2, 2024 for related PCT/US2022/047191 filed Oct. 19, 2022, 12 pages.

Philippe Charles et al.: "Accelerating the creation of customized, language-specific IDEs in Eclipse", ACM SIGPLAN Notices, Association for Computing Machinery, US, vol. 44, No. 10, Oct. 25, 2009 (Oct. 25, 2009), pp. 191-206, XP058304685; ISSN: 0362-1340, DOI: 10.1145/1639949.1640104; p. 192, right-hand col. line 25-35, p. 196, right-hand col. line 6-13, abstract.

Wallace Evan: "Multiplayer Editing in Figma", figma.com/blog, Sep. 28, 2016 (Sep. 28, 2016), XP055930547, Retrieved from the Internet: URL: https://www.figma.com/blog/multiplayer-editing-in-figma/ [retrieved on Jun. 13, 2022] the whole document, 7 pages.

Written Opinion dated Apr. 10, 2024 in PCT/US2023/020890.

* cited by examiner

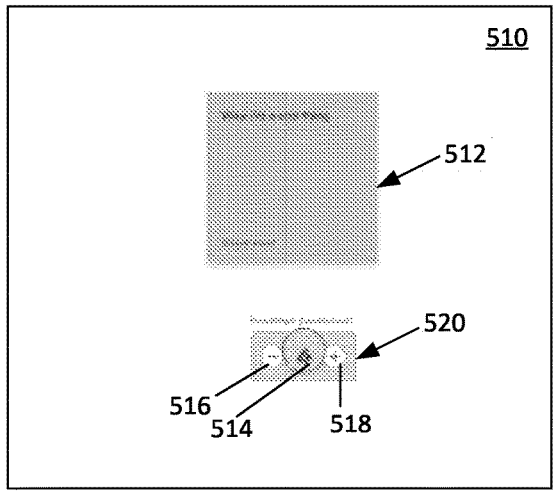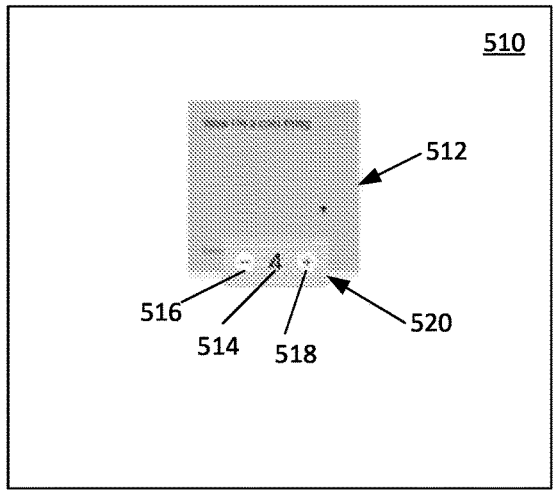
FIG. 5A  FIG. 5B
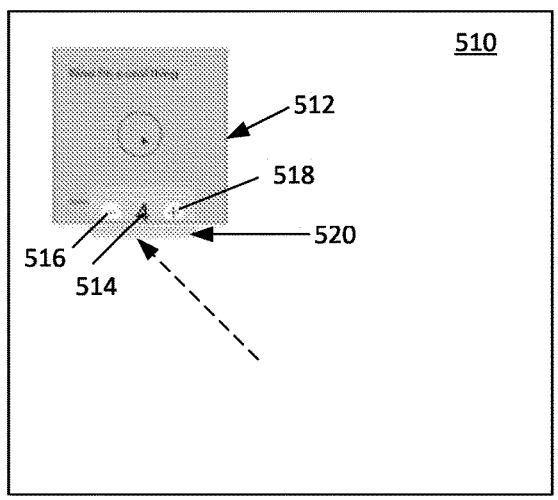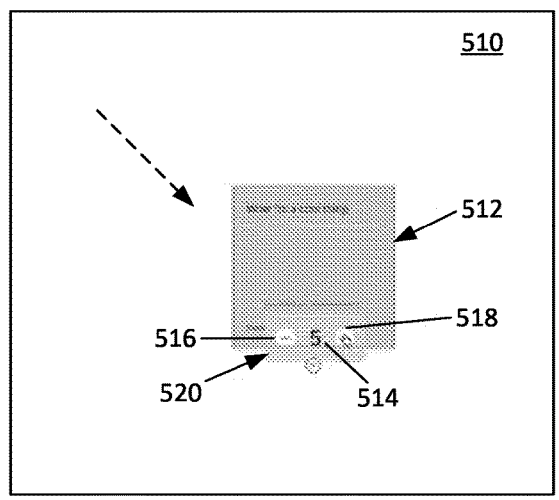
FIG. 5C  FIG. 5D

INTEGRATED APPLICATION PLATFORM TO IMPLEMENT WIDGETS

RELATED APPLICATION(S)

This application claims benefit of priority to Provisional U.S. Patent Application No. 63/236,645, filed Aug. 24, 2021; the aforementioned priority application being hereby incorporated by reference in its entirety.

TECHNICAL FIELD

Examples described herein relate to an integrated application platform, and more specifically, to an integrated application platform to implement widgets.

BACKGROUND

Software design tools have many forms and applications. In the realm of application user interfaces, for example, software design tools require designers to blend functional aspects of a program with aesthetics and even legal requirements, resulting in a collection of pages which form the user interface of an application. For a given application, designers often have many objectives and requirements that are difficult to track.

BRIEF DESCRIPTION OF THE DRAWINGS

FIG. 5A through FIG. 5D illustrate an example of an interactive widget component that is rendered on a canvas of a computing device, according to one or more embodiments.

DETAILED DESCRIPTION

Figure 1A:
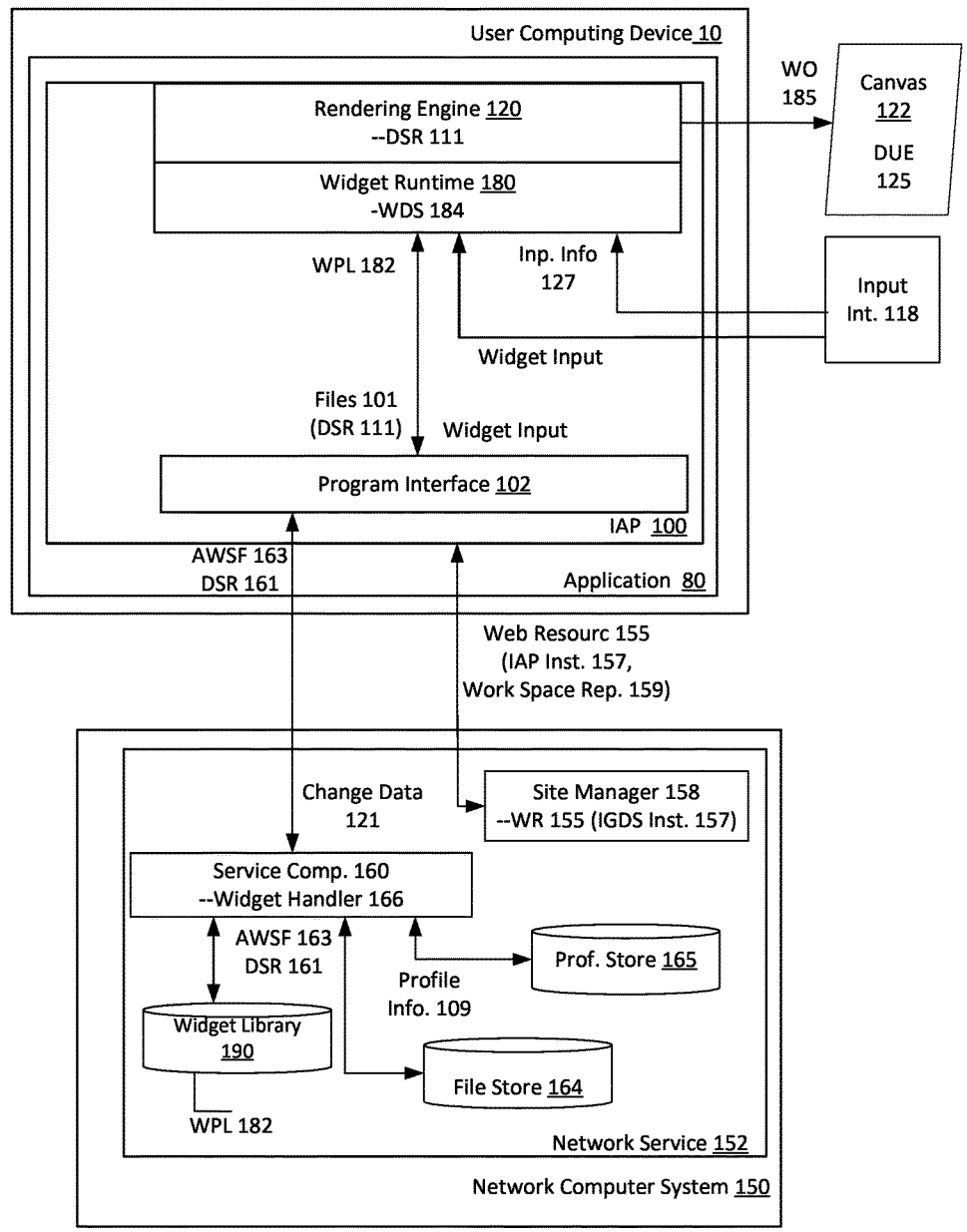
FIG. 1A illustrates a network computing system for an interactive graphic application platform that implements widgets, according to one or more examples.

Examples include an interactive application platform to implement widgets. According to examples, an integrated application platform enables users to select and implement widgets, in order to insert widget objects with rendered content. The widget objects are persistent content elements that are dynamically responsive to user input. Further, the widget objects are associated with functionality that extends or supplements the functionality provided by the integrated application platform.

According to examples, a network computer system operates to enable multiple user computing devices to utilize any one of multiple application services to create and update a workspace file. The network computer system can store the updated workspace file in connection with an account associated with a user of the first user computing device. In a collaborative environment, the network computer system detects changes to an instance of a workspace on the computing devices of a given user in a group of collaborators. The network computer system then propagates the detected changes in real-time (or near real-time) to instances of the workspace file on computing devices of other users in the group of collaborators.

In examples, a computing system is configured to implement an interactive application platform for utilizing multiple application services. In some examples, the integrated application platform enables a user to use multiple editors with a shared canvas on which content is rendered, where each editor is provided by a different application service. Further, the user can toggle between application services while maintaining the content continuously rendered on the canvas.

In some examples, a network computer system is provided to include memory resources store a set of instructions, and one or more processors are operable to communicate the set of instructions to a plurality of user devices. The set of instructions can be communicated to user computing devices, in connection with the user computing devices being operated to render a corresponding design under edit on a canvas, where the design under edit can be edited by user input that is indicative of any one of multiple different input actions. As described by various examples, the instructions and data communicated to the computing devices enable the respective computing devices to select one of multiple application services to access, view and edit a rendered design on a canvas.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1A illustrates a network computing system to implement an interactive application platform on a user computing device, according to one or more examples. A network computing system such as described with an example of FIG. 1A can be implemented using one or more servers which communicate with user computing devices over one or more networks. In examples, the network computing system 150 performs operations to enable an interactive application platform ("IAP 100") to be implemented on user computing devices 10. In examples, the IAP 100 provides, or otherwise enables a user's computing device to utilize one or more application services, where each application service provides a particular type of application functionality. By way of example, the application service(s) include (i) an interactive graphic application service, to enable users to create and share dynamic and interactive designs, including designs that can be prototyped or imported to a run-time environment; (ii) a whiteboarding application service, to enable users to create and share visual content to share ideas with other users; (iii) a code creation application service to enable code creation and representation based on graphical and/or textual input; (iv) a presentation application service to enable users to create and share presentations; (v) a word processing application service; and/or (vi) an application to enable users to create and share one or more types of structured data sets (e.g., database, spreadsheet, table, etc.). Accordingly, each application service can provide functionality and configurations that are separate from the other application service(s). Further, each application service can be provided from a common source (e.g., website), and share a common set of resources, such as a common framework, utilities, user-interface and/or functional features and elements.

According to examples, the IAP 100 can be implemented on a user computing device 10 to enable a corresponding user to utilize one of multiple application services in a network or collaborative environment. Each design application can include resources and instructions to enable the user to access, update and/or create a corresponding workspace file. In particular, the IAP 100 can generate a canvas 122 on which the workspace file is rendered as user-created content 125, and the user can edit the content 125 to update the workspace file.

Still further, in some examples, the IAP 100 executes on each user computing device 10 as a multi-modal web-based application, with each mode corresponding to one of multiple application services that are provided through a network service provided by the network computing system 150. The IAP 100 can operate in either of multiple modes to render the workspace file (e.g., as content 125) and to update the workspace file using the application service of the mode in use.

According to examples, a user of computing device 10 operates web-based application 80 to access a network site, where programmatic resources are retrieved and executed to implement the IAP 100. The web-based application 80 can execute scripts, code and/or other logic (the "programmatic components") to implement functionality of one or more application services provided by the IAP 100. In examples, the web-based application 80 can correspond to a commercially available browser, such as GOOGLE CHROME (developed by GOOGLE, INC.), SAFARI (developed by APPLE, INC.), and INTERNET EXPLORER (developed by the MICROSOFT CORPORATION). In such examples, the processes of the IAP 100 can be implemented as scripts and/or other embedded code which web-based application 80 downloads from a network site. For example, the web-based application 80 can execute code that is embedded within a webpage to implement processes of the IAP 100. The web-based application 80 can also execute the scripts to retrieve other scripts and programmatic resources (e.g., libraries) from the network site and/or other local or remote locations. By way of example, the web-based application 80 may execute JAVASCRIPT embedded in an HTML resource (e.g., web-page structured in accordance with HTML 5.0 or other versions, as provided under standards published by W3C or WHATWG consortiums). In some examples, the rendering engine 120 may utilize graphics processing unit (GPU) accelerated logic, such as provided through WebGL (Web Graphics Library) programs which execute Graphics Library Shader Language (GLSL) programs that execute on GPUs.

The IAP 100 can be implemented as part of a network service, where web-based application 80 communicates with one or more remote computers (e.g., server used for a network service) to executes processes of the IAP 100. The web-based application 80 retrieves some or all of the programmatic resources for implementing the IAP 100 from a network site. The web-based application 80 may also access various types of data sets in providing the IAP 100. The data sets can correspond to files and design libraries (e.g., pre-designed design elements), which can be stored remotely (e.g., on a server, in association with an account) or locally. In examples, the network computer system 150 provides a shared design library which the user computing device 10 can use with either application service. In this way, the user may initiate a session to implement the IAP 100 for purpose of creating or editing the workspace file, as rendered on the canvas 122, in accordance with one of multiple application services of the IAP 100.

In examples, the IAP 100 includes a program interface 102, an input interface 118 and a rendering engine 120. The program interface 102 can include one or more processes which execute to access and retrieve programmatic resources from local and/or remote sources. In an implementation, the program interface 102 can generate, for example, a canvas 122, using programmatic resources which are associated with web-based application 80 (e.g., HTML 5.0 canvas). As an addition or variation, the program interface 102 can trigger or otherwise cause the canvas 122 to be generated using programmatic resources and data sets (e.g., canvas parameters) which are retrieved from local (e.g., memory) or remote sources (e.g., from network service).

The program interface 102 may also retrieve programmatic resources that include an application framework for use with canvas 122. The application framework can include data sets which define or configure, for example, a set of interactive tools that integrate with the canvas 122 and which comprise the input interface 118, to enable the user to provide input for creating and/or editing a particular type of content. In examples, the set of interactive tools can include graphic tools that enable a user to create one or multiple types of graphical content (e.g., graphic design interface and/or whiteboard design or content, etc.).

According to some examples, the input interface 118 can be implemented as a functional layer that is integrated with the canvas 122 to detect and interpret user input. The input interface 118 can, for example, use a reference of the canvas 122 to identify a screen location of a user input (e.g., 'click'). Additionally, the input interface 118 can interpret an input action of the user based on the location of the detected input (e.g., whether the position of the input indicates selection of a tool, an object rendered on the canvas, or region of the canvas), the frequency of the detected input in a given time period (e.g., double-click), and/or the start and end position of an input or series of inputs (e.g., start and end position of a click and drag), as well as various other input types which the user can specify (e.g., right-click, screen-tap, etc.) through one or more input devices. In this manner, the input interface 118 can interpret, for example, a series of inputs as a design tool selection (e.g., shape selection based on location of input), as well as inputs to define attributes (e.g., dimensions) of a selected shape.

In some examples, the IAP 100 includes instructions that enable a user computing device to utilize multiple application services at one time, in connection with the user computing device accessing, updating and/or creating a workspace design file. In examples, each workspace file can be associated with a particular application service, and by default, a computing device that opens the workspace file utilizes the default application service to access and update that workspace file. The user may also switch modes on the IAP 100 to utilize another application service to update the workspace file.

The network computing system 150 can include a site manager 158 to manage a website where a set of web-resources 155 (e.g., web page) are made available for the web-based application 80 of user computing devices 10. The web-resources 155 can include instructions, such as scripts or other logic ("IAP instructions 157"), which are executable by browsers or web components of user computing devices. The web resources 155 can also include (i) shared resources, provided to the user computing devices in connection with the user computing devices utilizing either of the application services, and (ii) design application specific resources, which execute on the user computing devices for a particular one of the available application services. In some examples, the web resources 155 include a shared design library of design elements, which enable the user to select predetermined design or content elements for use on the canvas 122 in connection with either of the application services.

In some variations, once the computing device 10 accesses and downloads the web-resources 155, web-based application 80 executes the IAP instructions 157 to implement functionality as described with examples. For example, the IAP instructions 157 can be executed by web-based application 80 to initiate the program interface 102 on the user computing device 10. The initiation of the program interface 102 may coincide with the establishment of, for example, a web-socket connection between the program interface 102 and a service component 160 of the network computing system 150.

In some examples, the web-resources 155 includes logic which web-based application 80 executes to initiate one or more processes of a program interface 102, causing the IAP 100 to retrieve additional programmatic resources and data sets for implementing functionality as described by examples. The web resources 155 can, for example, embed logic (e.g., JAVASCRIPT code), including GPU accelerated logic, in an HTML page for download by computing devices of users. The program interface 102 can be triggered to retrieve additional programmatic resources and data sets from, for example, the network service 152, and/or from local resources of the computing device 10, in order to implement each of the multiple design applications of the IAP 100. For example, some of the components of the IAP 100 can be implemented through web-pages that can be downloaded onto the computing device 10 after authentication is performed, and/or once the user performs additional actions (e.g., download one or more pages of the workspace associated with the account identifier). Accordingly, in examples as described, the network computing system 150 can communicate the IAP instructions 157 to the computing device 10 through a combination of network communications, including through downloading activity of web-based application 80, where the IAP instructions 157 are received and executed by web-based application 80.

The computing device 10 can use web-based application 80 to access a website of the network service 152 to download the webpage or web resource. Upon accessing the website, web-based application 80 can automatically (e.g., through saved credentials) or through manual input, communicate an account identifier to the service component 160. In some examples, web-based application 80 can also communicate one or more additional identifiers that correlate to a user identifier.

Additionally, in some examples, the service component 160 can use the user or account identifier of the user identifier to retrieve profile information 109 from a user profile store 165. As an addition or variation, profile information 109 for the user can be determined and stored locally on the user's computing device 10.

The service component 160 can also retrieve the files of an active workspace ("active workspace files 163") that are linked to the user account or identifier from a file store 164. The profile store 165 can also identify the workspace that is identified with the account and/or user, and the file store 164 can store the data sets that comprise the workspace. The data sets stored with the file store 164 can include, for example, the pages of a workspace and one or more data structure representations 161 for content under creation (e.g., a design under edit) from the respective active workspace files. As an addition or variation, each file can be associated with metadata that identifies the design application that was used to create the particular file.

Additionally, in examples, the service component 160 provides a representation 159 of the workspace associated with the user to the web-based application 80, where the representation identifies, for examples, individual files associated with the user and/or user account. The workspace representation 159 can also identify a set of files, where each file includes one or multiple pages, and each page including objects that are part of a design interface.

On the user device 10, the user can view the workspace representation through web-based application 80, and the user can elect to open a file of the workspace through web-based application 80. In examples, upon the user electing to open one of the active workspace files 163, web-based application 80 initiates the canvas 122. For example, the IAP 100 can initiate an HTML 5.0 canvas as a component of web-based application 80, and the rendering engine 120 can access one or more data structures representations 111 of the rendered content 125 on the canvas 122. In some implementations, the data structure representation 111 can be structured in node and object form. For example, the data structure representation 111 can correspond to a document object model (DOM) representation, where content elements of the rendered 125 correspond to nodal elements of the DOM.

In examples, the IAP 100 can be implemented to execute with multiple modes of operation, where each mode corresponds to one of the application services provided by the network computer system 150. The program interface 102 can include alternative modes of operation. For example, the application framework and input interface 118 can differ in form, function or configuration as between the alternative modes of the IAP 100. In some examples, the set of interactive tools or editor provided by the program interface 102 can differ based on the application service which the workspace file is associated with. Additionally, the type of actions the user can perform to register input can vary based on the alternative modes of the program interface 102. Still further, the different modes of program interface 102 can include different input or user-interface features for the user to select and use for inclusion on the canvas 122. By way of example, when the IAP 100 is operating in a mode for a whiteboarding application service, the program interface 102 can provide input features to enable a user to select a design element that is in the form of a "sticky note," while in an alternative mode for an interactive graphic design application service, the "sticky note feature" is not available. However, in the alternative mode, the user may be able to select anyone of numerous possible shapes or previously designed objects which the user can write textual messages in for display on the canvas 122.

Still further, the rendering engine 120 can include logic to enable alternative behaviors for different modes of operation, based on the application service that is in use. By way of example, the rendering engine 120 can implement mode-specific logic to vary, based on the mode of operation, the behavior of objects that are selected, the manner in which objects can be resized or moved, as well as the manner in which objects are rendered on the canvas 122.

Additionally, each of the application services can utilize a shared library of content elements, as well as core functionality that enables content elements to be shared and updated between the different application services that are available through the platform. Additionally, the file type (e.g., workspace file) created and edited through use of one application service can be utilized with the other application service. Moreover, the transition between application services can be seamless—for example, the user computing device 10 can open a workspace file using the first application service (e.g., interactive graphic application service for UIX design) then seamlessly switch to using the second application service (e.g., whiteboarding application service) while the same content is continuously rendered on the canvas. Thus, for example, the user can switch application services while working on a workspace file, without closing the workspace file. In such example, each application service enables the user to update the workspace file even while the workspace file is in use in a collaborative environment. In such examples, the user can mode switch the IAP 100 to switch which application service is being used with the workspace file.

In examples, the IAP 100 is operable on the user computing device 10 to selectively implement widgets with the IAP 100. The IAP 100 can include a widget runtime component 180 that executes as part of the rendering engine 120 to implement selected widgets on the computing device 10. The widget runtime component 180 can provide an application program interface ("API") to enable the IAP 100 to access and use programming, scripts, code and/or other data of a selected widget.

Widgets

A widget includes a program (or a combination of programs), script(s) and/or code, executable to provide functionality that generates a persistent, functional and interactive object (termed "widget object 185") that is inserted or otherwise provided with the content 125 rendered on the canvas 122. When a widget is implemented on a user computing device, the widget can include (i) a widget object 185, which is rendered as a content element, and (ii) a widget data structure 184, which provides a representation of the widget object 185. The widget object 185 can include functional, interactive elements that receive input and change state. In at least some examples, a widget is provided by a third-party source, separate from the source of the IAP 100.

In examples, a widget is associated with resources provided by a third-party (e.g., a party other than the developer of the IAP 100). The widget resources can reside on the network computer system 150, such as with a widget library 190. The resources of each widget can include programs, scripts, code and/or other data sets, collectively termed widget programming logic ("WPL") 182, for implementing the widget on the user computing device 10.

In variations, the WPL 182 includes transactional and/or distributive logic (i) communicated to the user computing device 10 in response to one or more predetermined events (e.g., user interactions), and (ii) executed by the widget runtime component 180 of the rendering engine 120 in response to the predetermined events. In examples, the WPL 182 includes (i) logic that is initially provided by the network computer system 150 to implement the widget, and (ii) logic that is embedded or integrated with a data representation of the content 125 that rendered on the canvas 122, where the embedded logic is triggerable through user interaction and/or other predetermined events that may occur with respect to the content 125 as rendered on the canvas 122.

Accordingly, the WPL 182 may include separate sets of programming, script and data, which are communicated to the user computing device 10 at different times, such as at an initial time when the widget is first implemented with the canvas 122, and at subsequent times such as after each instance in which the user interacts with the widget (e.g., logic associated with a function that is called by the IAP 100). In some examples, the WPL 182 can be initially communicated to the widget runtime component 180 from the network computer system 150. The WPL 182 can also be copied and stored in cache or with other local resources, such that in subsequent instances, the widget runtime component 180 retrieves the WPL 182 from the local resource, rather than from the network computer system 150. In context of examples, as described, reference to "widget programming logic" or "WPL 182" is intended to include scenarios where the WPL 182 that is transmitted or executed at a particular instance represents a portion of the total executable logic that exists for a particular widget, where the total executable logic defines the overall functionality of a corresponding widget.

According to some embodiments, a selected widget can be implemented by the rendering engine 120 executing the WPL 182 to (i) create or update a widget data structure 184 of the widget object render or update a widget object 185 to include one or more components and interactive elements that are positioned within a boundary of the widget object 185; and (ii). Further, the widget data structure 184 can include metadata set(s) that define a state or attribute of the widget object. In some examples, the widget data structure 184 can include or correspond to a widget node that can be integrated with a DOM representation of the content 125 rendered on the canvas 122.

In examples, the widget data structure 184 defines attributes of the widget component 185, and further associates inputs or events with functions that are retrieved as part of the widget's WPL 182. Accordingly, responsive to detected events, the rendering engine 120 uses the widget runtime component 180 to call and implement functions (or other WPL 182) that are identified in the widget data structure 184, in order to change a set of attributes, a value and/or a state of the widget object 185. Further, the change to the widget object 185 can also change the widget data structure 184, so that the widget data structure reflects the change to the widget object 185.

As further described, in some examples, the widget object 185 can be repositioned, resized or otherwise manipulated (e.g., change attributes associated with a frame of the widget object) about the canvas 122. The widget object 185 also defines interactive elements that are provided within a defined region (e.g., within a frame of the widget object 185) to receive input. When interactions are detected with respect to the interactive elements of the widget component 185, the widget data structure 184 identifies one or more functions to implement in response to the detected event.

Widget Library

In examples, the network computer system 150 can provide a widget library 190 to enable the IAP 100 with access to a collection of widgets for a user or account. For example, the widget library 190 can be provided as part of the network service 152, such as in the form of a widget marketplace or collection, from which a user can search and make selection of individual widgets for use with the content 125 on the canvas 122. In examples, widgets can be selectively executed with the IAP 100 to provide, for example, an interactive feature that is persistent and integrated with the content 125 of the canvas 122. The user can search or otherwise interact with the widget library 190 to select a particular widget. For example, the user can perform a search of the widget library 190 to identify a selected widget. In variations, widgets can be provided from third-party sites or resources. Still further, in some variations, the program interface 102 can access an online widget store or network database to enable the user computing device 10 to access and use widgets.

The widget library 190 can include the WPL 182 for each of multiple widgets that are available to the user computing device 10. In variations, the widget library 190 can include a reference or pointer to the WPL 182 and/or other resources of a given widget. The widget runtime component 180 can then use the pointers to retrieve the WPL 182 from other network sources.

Implementation of Widget with Canvas

A user of computing device 10 can select to implement a particular widget on a given canvas 122 or document. When the user selects to launch a particular widget on the canvas 122, network computer system 150 executes a widget handler 166 to access and transmit the WPL 182 of the selected widget to the IAP 100 of the computing device 10, and the widget runtime component 180 executes the WPL 182 to initiate the widget by creating (i) a widget object 185 that is rendered on the canvas 122, and (ii) a widget data structure 184 that corresponds to the widget object 185. The widget object 185 can overlay a portion of the canvas 122 and form a persistent feature of the content 125. In examples, various operations can be performed with respect to the canvas 122 and the rendered widget object 185 without triggering use of WPL 182. For example, the rendering engine 120 can operate to resize or reposition the widget object 185, based on corresponding user input that is directed to manipulating the widget object 185 as an object of the canvas 122. As an additional example, the canvas 122 can be closed and then opened to include the rendered widget object 185 without executing any WPL 182 for the widget. In this way, the widget object 185 can persistently exist as a content element of the canvas 122 and the rendered content 125 (e.g., graphic design, whiteboard content, etc.), subject to the rules and logic of the rendering engine 120. However, as described in more detail, input directed to an interactive aspect of the widget object 185 (e.g., input that triggers a selectable or active feature within the frame of the widget object 185) can trigger execution of widget-specific programming logic 182, which in turn can change a state of the widget object 185.

Widget Runtime Component

In examples, the rendering engine 120 includes a widget runtime component 180 to execute the WPL 182 of a corresponding widget object 185. The widget runtime component 180 operates to selectively execute the WPL 182 of a selected widget that is launched for use with a canvas 122. Among other tasks, the widget runtime component 180 can operate to detect user input that is intended to be a widget interaction, retrieve WPL 182 from a network or local resource based on the detected user input, and execute the retrieved WPL 182 to generate and/or modify a widget object 185.

In examples, multiple instances of the widget runtime component 180 can be initiated to perform tasks for multiple widgets that are selectively implemented on the canvas 122. Thus, for example, the widget runtime component 180 can render multiple different widget objects 185, where each widget object 185 is associated with a corresponding WPL 182.

The widget runtime component 180 can detect widget input that is intended to be interactive with the widget object 185. For example, the widget runtime component 180 can detect input that overlays an interior of a widget object 185 that is rendered on the canvas 122. The widget runtime component 180 can capture the widget input, retrieve WPL 182 from the widget handler 166, or from a local source, as described with some examples. In some examples, the retrieved WPL 182 is based on the widget input. The widget runtime component 180 executes the WPL 182 to modify the widget object 185, along with the data structure representation 184 of the widget object 185, to reflect input that changes a state of the widget object 185 by, for example, changing a value associated with the widget object 185. Thus, the widget runtime component 180 can operate to retrieve and execute the WPL 182 as a response to a user interaction with the widget object 185, so as to change the widget object 185 and the corresponding widget data structure 184 to reflect the new or updated state.

By way of example, the widget object 185 can be an interactive object that includes a frame, with one or more interactive features provided within the frame. The data structure representation 184 of the widget object 185 can also be integrated with the data structure representation 111 of the content 125, as rendered on the canvas 122. The widget runtime component 180 can process input to resize, move, or alter attribute of the widget object 185 using the rendering engine 120, while input that is detected as being interactive with one of the interactive features within the frame triggers the widget runtime component 180 to retrieve and execute associated WPL 182. The execution of WPL 182 can modify the state of the widget object 185, and the widget data structure 184 associated with the widget object 185 can be updated to reflect the update state of the widget object 185. Accordingly, in examples, the widget runtime component 180 can initially interpret user input as being directed to execution of the widget (or input that causes the widget to change states) based on position information associated with the input. For example, the widget runtime component 180 can interpret input received within a frame or boundary of a widget object, or within a particular region of the widget object 185 as being input that is to be executed by the WPL 182. On the other hand, input that is directed to a position on the canvas 122 that is outside the boundary or frame of the widget object 185, or not overlaid over a particular portion of the widget object 185, can be executed by the rendering engine 120 without use of the WPL 182.

In variations, once the WPL 182 is executed, the WPL 182 can associate logic with the widget object 185 that configures the determination of when the user input is interpreted by the WPL 182, rather than the rendering engine 120. For example, the WPL 182 can execute to create the widget object 185 to include a non-visible layer or region, where the non-visible layer or region defines a condition or region (e.g., buffer area around the frame of the widget object 185) where input from the user can be interpreted by execution of the respective WPL 182.

Figure 1B:
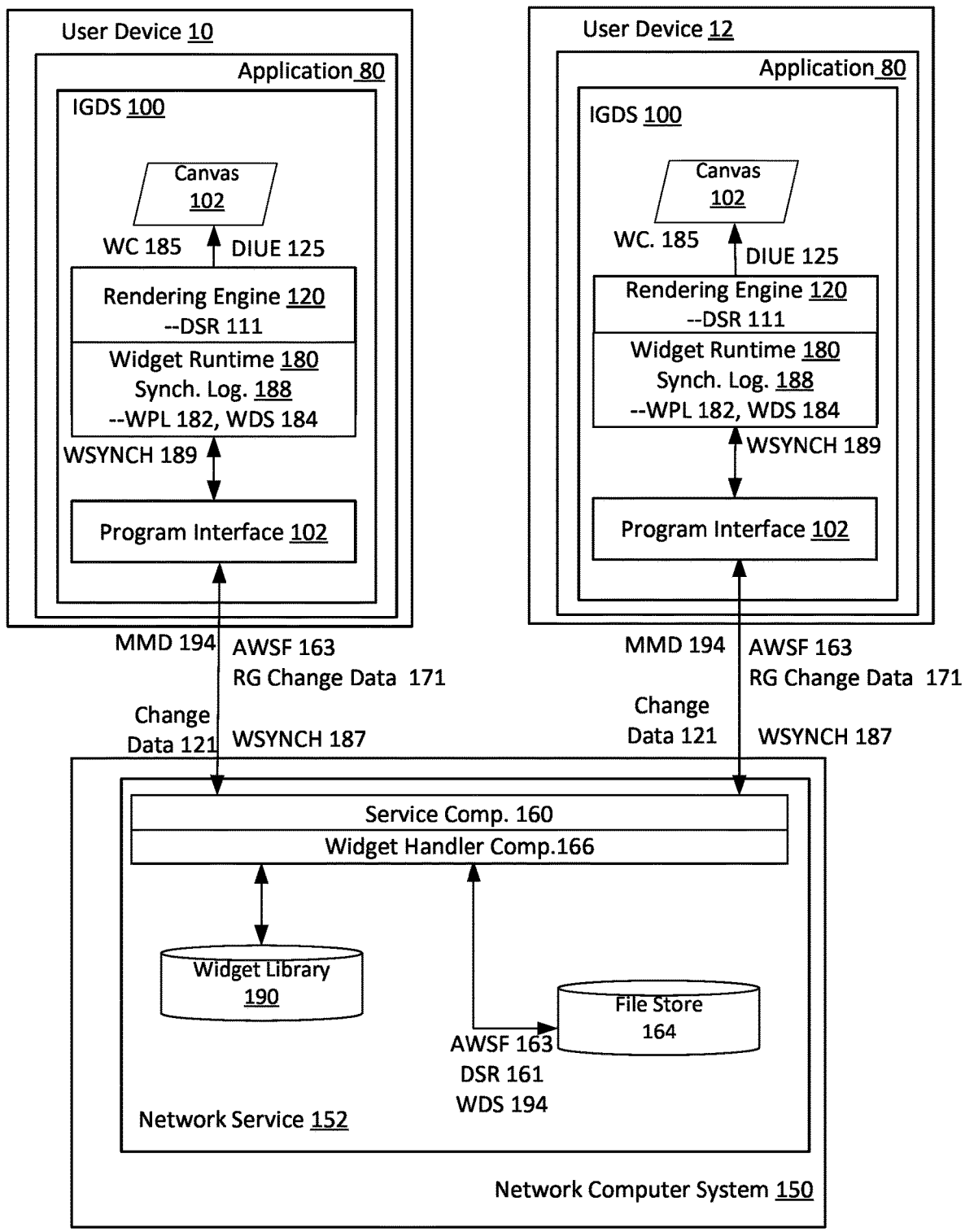
FIG. 1B illustrates a network computing system for a collaborative interactive graphic application platform that implements widgets, according to one or more examples.

FIG. 1B illustrates a network computing system to implement an interactive application platform for multiple users in a collaborative environment, according to one or more embodiments. In an example of FIG. 1B, a collaborative environment is implemented by the network computing system 150, which communicates with multiple user computing devices 10, 12 over one or more networks (e.g., World Wide Web) to implement the IAP 100 on each computing device. While FIG. 1B illustrates an example in which two users utilize the collaborative network platform, examples as described allow for the network computing system 150 to enable collaboration on design interfaces amongst a larger group of users.

With further reference to FIG. 1B, the user computing devices 10, 12 can be operated by users that collaborate to create and/or update the content 125. In examples, the user computing devices 10, 12 are associated with a common account, with each user computing device 10, 12 implementing a corresponding IAP 100 to access the same workspace during respective sessions that overlap with one another. Accordingly, each of the user computing devices 10, 12 may access the same set of active workspace files 163 at the same time, with the respective program interface 102 of the IAP 100 on each user computing device 10, 12 operating to establish a corresponding communication channel (e.g., web socket connection) with the service component 160.

The service component 160 can communicate a copy of the active workspace files 163 to each user computing device 10, 12, such that the computing devices 10, 12 can utilize the active workspace file 163 at the same time to render the content 125. In some examples, an active workspace file 163 can be associated with a default application service, and each computing device 10, 12 can open the active workspace file 163 using the associated (or default) application service. Each of the computing devices 10, 12 can maintain a local data structure representation 111 of the content 125. The service component 160 can also maintain a network-side data structure representation 161 obtained from the files of the active workspace 163, and coinciding with the local data structure representations 111 on each of the computing devices 10, 12. In examples, each of the local data structure representation 111 and the network-side data structure representation 161 can represent content 125 as nodes and objects. For example, each of the local and network-side data structure representations 111, 161 can be structured as a document object model (DOM) representation (e.g., with individual content elements being represented as a node of the DOM). Further, in such examples, the widget data structure 184 of the widget object 185 can be integrated with the local and network-side data structure representations 111, 161.

In some examples, the user of the computing devices 10, 12 can switch the operational mode of the IAP 100 so as to view and update the workspace using an alternative application (e.g., non-default) application service. For example, each of a first or default application service and an alternative application service can render the content 125 using the local data structure representation 111, where the content 125 can be provided in each of the respective application services using tools and functionality that are specific to the particular application service. Further, in some variations, the active workspace file 163 can be updated by the users utilizing either of the application services.

By way of example, during a collaboration session, users can collaboratively view and edit the workspace file using one or multiple alternative application services, such as a graphic design application and/or whiteboarding application service. In such an example, the network computer system 150 can detect changes made by users that utilize either of a graphic design application service or whiteboarding application service, and the network computer system 150 can propagate detected changes on any one of the user computing devices 10, 12 to the other user computing devices. Further, individual users that participate in the collaborative environment can download and open the workspace file 163 using a default application service (e.g., whiteboarding application service), then switch to the other application service (e.g., design application service) without closing the workspace file. Further, the user can initiate a widget from the widget library 190, to initiate a widget object 185 having a corresponding widget data structure 184, where the data structure representation 111 of the content 125 integrates the widget data structure 184. In such examples, any of multiple application services can execute the WPL 182 of the selected widget to initiate and update the widget object 185, as well as the corresponding widget data structure 184.

In some examples, the web resources 155 which are available with a given workspace file 163 to include a content library of content elements, such as design elements where, for example, wire-frame shapes and/or shapes with attributes (e.g., color, line thickness, etc.) can be stored. Depending on implementation, the content library can be made available to one or more of the application services.

Still further, in examples, the content application library can be updated by users using either of the application services. Moreover, in some variations, changes made by individual users to content elements of the content library can be propagated to (i) instances of the content library provided to other user computing devices (e.g., such as users of a collaborative session), and/or (ii) the design interfaces rendered on local canvas of other users which utilize the particular content element.

To illustrate the latter variation, a user of a collaborative session can update a content element of the content library that is used in connection with an active workspace file of a collaborative session. Further, in variations, the user can update the content library using either of the application services. If the content element is in use on the content 125 that is shared during the collaborative session, the change to the content element as stored with the content library can be automatically detected by the network computer system 150, and the change can be propagated to each instance of the content library that is downloaded to the user computers, as well as the content element as rendered on the canvas 122 of the individual users of the collaborative session.

The network computing system 150 can continuously synchronize the active workspace files 163 on each of the user computing devices. In particular, changes made by users to a selected active workspace file 163 on one computing device 10, 12 may be immediately (i) reflected in the respective data structure representation 161 of the workspace file, and (ii) rendered on the other user computing device 10, 12. By way of example, the user of computing devices 10, 12 can make a change to the respective workspace file 163, rendered as content 125, and the respective rendering engine 120 can implement an update that is reflected in the local data structure representation 111. From the computing device 10, the program interface 102 of the IAP 100 can stream change data 121, reflecting the change of the user input, to the service component 160. The service component 160 processes the change data 121 of the user computing device. The service component 160 can use the change data 121 to make a corresponding change to the network-side data structure representation 161. The service component 160 can also stream remotely-generated change data 171 (which in the example provided, corresponds or reflects change data 121 received from the user device 10) to the computing device 12, to cause the corresponding IAP 100 to update the workspace file as rendered on the other device. The computing device 12 may also use the remotely generated change data 171 to update with the local data structure representation 111 of that computing device 12. The program interface 102 of the computing device 12 can receive the update from the network computing system 150, and the rendering engine 120 can update the workspace file and the respective local copy of 111 of the computing device 12.

The reverse process can also be implemented to update the data structure representations 161 of the network computing system 150 using change data 121 communicated from the second computing device 12 (e.g., corresponding to the user of the second computing device updating the workspace file as rendered on the second computing device 12). In turn, the network computing system 150 can stream remotely generated change data 171 (which in the example provided, corresponds or reflects change data 121 received from the user device 12) to update the local data structure representation 111 of the workspace file 163 on the first computing device 10. In this way, the workspace file 163 of the first computing device 10 can be updated as a response to the user of the second computing device 12 providing user input to change the workspace file.

To facilitate the synchronization of the data structure representations 111, 111 on the respective computing devices 10, 12, the network computing system 150 may implement a stream connector to merge the data streams which are exchanged between the first computing device 10 and the network computing system 150, and between the second computing device 12 and the network computing system 150. In some implementations, the stream connector can be implemented to enable each computing device 10, 12 to make changes to the network-side data structure representation 161, without added data replication that may otherwise be required to process the streams from each device separately.

Additionally, over time, one or both of the computing devices 10, 12 may become out-of-sync with the server-side data structure representation 161. In such cases, the respective computing device 10, 12 can redownload the active workspace files 163, to restart the maintenance of the data structure representation 111 of the workspace file that is rendered and edited on that device.

Widgets in Collaborative Environment

With reference to FIG. 1B, the widget runtime component 180 includes logic to synchronize implementation of widgets amongst multiple computing devices that share the canvas 122 in a collaborative environment. In particular, each computing device 10, 12 of the collaborative environment can render an instance of a widget object 185, and the instances of the widget object 185 can be synchronized, as the state of the respective instances of widget objects 185 changes, based on user interactivity and/or other predetermined events.

Initiating Instances of Widget on Computing Devices

Any of the user computing devices 10, 12 can initiate ("initiating user") a particular widget for the collaborative session. The widget runtime component 180 retrieves and executes WPL 182 from the widget handler 166 to generate a (i) widget object 185 on the canvas 122, and (ii) a widget data structure 184 that represents the widget object 185. The widget data structure 184 can include node and object data, including metadata, to (i) represent the widget object 185 in a current and initial state, and (ii) define an interactivity or responsive behavior of the widget object 185. Additionally, the execution of the WPL 182 causes the corresponding widget data structure 184 to be created and integrated with the content representation 111 of that computing device. As with other examples, the widget data structure 184 can include or correspond to a widget node that defines the interactivity or responsive behavior of the widget object 185.

Once the initiating computing device 10 implements the widget, the widget data structure 184 generated on the initiating computing device 10 is synchronized to other computing devices 10, 12 of the collaborative environment, such that (i) each of the other computing devices 10, 12 render the widget object 185 on their respective canvas 122, as part of the interactive content 125; and (ii) each of the other computing devices 10, 12 integrate the widget data structure 184 (e.g., widget node) into the data structure representation 111 of the shared content 125. In such examples, only the initiating user computing device 10 utilizes the WPL 182 of the selected widget to generate the initial widget data structure 184 and corresponding widget object 185. The non-initiating user computing device(s) 12 implements the widget by synchronizing with the initiating user computing device 10 (via the network computing system 150), to receive an instance of the widget data structure 184, and rendering the widget object 185 based on data received through synchronization with the initiating computing device 10.

The initial synchronization operation to synchronize the selected widget from the initiating computing device 10 to one or more non-initiating computing devices can include the initiating computing device 10 utilizing widget synchronization logic 188 to transfer widget synchronization data 187 to the network computing system 150. When synchronization follows initial implementation of a widget on the initiating computing device 10, the widget synchronization data 187 includes or otherwise corresponds to the widget data structure 184, including the associated metadata.

On the network computing system 150, the widget handler 166 maintains a widget data structure 194 of an initiated widget. The widget handler 166 receives (i) the widget synchronization data 187; (ii) creates a network-side widget data structure 194 (e.g., such as a widget DOM), based on the current widget data structure 184 of one of the user computing devices 10, 12 (e.g., WD0); and (iii) broadcasts service-side widget synchronization data 189 (which initially includes the widget synchronization data 187 received from the initiating computing device 10) to each of the non-initiating user computing devices 12.

On the receiving computing device 10, 12, the widget runtime component 180 implements the synchronization logic 188 to create a new instance of the widget data structure 184 based on the received service-side widget synchronization data 189. Once the new version of the widget data structure 184 is created, the widget object 185 can be rendered. In some examples, the rendering engine 120 generates the widget object 185 by performing the difference operation as between the new widget data structure 184 and the data representation of the content 111. The widget object 185 is then rendered on the receiving computing device 10, 12 to reflect the updated state. In such ways, the state of the instances of the widget object 185 and widget data structure 184 on the non-initiating computing device(s) may be synchronized with the state of the instances of each of the other computing devices 10, 12, including the initiating computing device 10.

Updates and Synchronization of Widgets

Once an instance of the widget object 185 is rendered on the canvases 122 of the respective computing devices 10, 12, each user of the collaborative session can subsequently interact with the widget object 185 to trigger the widget object's functionality. On any of the user computing devices 10, 12, the widget runtime component 180 detects and processes the interactive input by using the widget data structure 184 to identify a corresponding function. For example, the rendering engine 120 can detect a user input, and based on the location and other information (e.g., the type of input), the widget runtime component 180 identifies a function call from the widget data structure 185. The widget handling component 180 retrieves the identified WPL 182 (e.g., makes a function call) to cause the widget object 185 and the widget data structure 184 to change state (in accordance with functions of the retrieved WPL 182). In this way, once the widget object 185 is rendered, subsequent interaction by the users of the computing devices 10, 12 with the respective instance of the widget object 185 causes the widget rendering component 180 of the corresponding IAP 100 to change the respective state of the widget data structure 184 and the widget object 185, so that the respective instances of the widget object and the widget data structure reflect the updated state change resulting from the user's interaction with the widget object 185. To illustrate, the user can interact with the widget object 185 to change the widget object's state (e.g., from W0 to W1) and the corresponding widget data structure 184 (e.g., WDS0 to WDS1), so that the updated widget data structure 184 (e.g., WDR1) reflects the current state of the widget object 185 (e.g., WO1).

According to some examples, when the user interacts with the widget object 185 to change its state, the state of the corresponding widget data structure 184 is changed, and the widget synchronization data 187 is transmitted to the network computing system 150. The widget runtime component 180 can update or re-render the widget object 185 in response to the user input, so that the state change is reflected on the user's canvas 122. In variations, the widget data structure 184 (or metadata included with the widget data structure 184) to reflect the state change. Synchronization is performed, with widget synchronization data 187 being transmitted to the network computing system, and server-side widget synchronization data is received from the network computing system 150 to update the widget data structure 184. In such implementations, the widget object 185 is updated to reflect the user input using the synchronized widget data structure 184.

Still further, in some examples, the widget runtime component 180 can implement the WPL 182 to ignore user input over intervals (e.g., 50 ms) where synchronized widget data 189 may be received, so as to avoid inconsistencies being developed as between the state of the widget, as maintained by the local widget data structure 184, versus the widget state maintained by the network-side widget data structure 194. Thus, for example, once the user interacts with the widget object 185, subsequent interaction with the widget object 185 may be ignored pending receipt of server-side synchronization data 189.

On the computing device where a most recent widget input is received, the widget runtime component 180 implements synchronization logic 188 to generate and stream widget synchronization data 187 from one computing device 10 (e.g., where widget input is received) to another computing device 12, via the network computing system 150. In examples, the synchronization logic 188 can execute on the computing device 10, 12 in response to the user interacting with the state of the widget component 185 being changed (e.g., such as by user input). Depending on implementation, the synchronization data 187 can include (i) widget data structure 184 (e.g., WDR1), representing the current state of the widget object 185; or (ii) a difference (or "diff") between the current widget data structure 184 (e.g., after widget input received, or WDR1) and the immediate prior version of the widget data structure (e.g., before the widget input received, or WDR0), such that the widget synchronization data 187 represents the change to the state of the widget data structure 184 (e.g., WDS1<DIFF> WDS0) on the computing device 10 where the input was received. Still further, in some examples, the widget synchronization data 187 includes metadata that identifies the state change of the widget on the user computing device where the input was received.

On the network computing system 150, the service component 160 receives the widget synchronization data 187 from the computing device 10 where the interaction to the widget object occurred. In one implementation, the widget handler 166 performs a difference operation (e.g., "diffs") between the widget data structure 184 of the current instance (e.g., WDS1) and the widget data representation of the immediately prior instance (e.g., WDS0), such that a difference between the representations (e.g., WDS1<DIFF>WDS0) identifies a change in state of the instances of the widget data structure 184 where the user interaction is received. In other implementations, the widget handler 166 receives metadata that identifies state information (e.g., the current state) of the widget on a respective computing device.

In examples, widget handler 166 updates the network-side widget data structure 194 (which may be integrated with the data structure representation 161). In one implementation, the widget handler 166 transmits server-side widget synchronization data 189 that identifies the determined difference between the widget data structures 184 to the computing device(s) that did not receive the user input and locally update the widget. In some implementations, the server-side widget synchronization data 189 includes metadata that identifies a state change to the widget.

As another example, the widget handler 166 overwrites a prior widget data structure with a new widget data structure 194, based on the widget synchronization data 187. The widget handler 166 transmits server-side widget synchronization data 189 that identifies the newly created widget data structures 194 to the computing device(s) 10, 12.

On each of the receiving computing devices 12, the widget runtime component 180 executes the synchronization logic 188 to reconcile the server-side widget synchronization data 189 with the instance of the most-recent widget data structure 184 that is local on that computing device. In in implementation, the widget runtime component 180 can execute the synchronization logic 188 to generate and/or update the widget data structure 184 to reflect the change in state represented by the server-side widget synchronization data 189.

In some examples, the rendering engine 120 generates the widget object 185 by performing the difference operation as between the new widget data structure 184 and the data representation of the content 111. The widget object 185 is then rendered on the receiving computing device 10, 12 to reflect the updated state. As an alternative or variation, the update to the widget object 185 can be rendered by performing the difference operation as between the new widget data structure 184 and the prior widget data structure 184. In this way, the synchronization states of each instance of the widget object 185 and widget data structures 184 is synchronized, such that the state of the instance of the widget object 185 is the same on the canvas 122 of each computing device 10, 12.

Once a selected widget object 185 is initiated and then rendered on each of the computing devices 10, 12, the widget runtime component 180 on each computing device 10, 12 can operate to detect widget input, and in response, retrieve and execute the WPL 182 to update the widget data structure 184. For example, a subsequent user interaction with the interactive object 185 on any of the computing devices 10, 12 causes the value of the widget to change, and the current widget data structure 184 can be updated (e.g., from WDS1 to WDS2) to reflect the widget object 185 (WO2) in its current state.

The manner in which the update to the widget object 185 occurs may vary, based on implementation. For example, as described with other examples, the local instance of the widget object 185 where the input is received may be updated once the widget data structure 184 is synchronized. Further, input directed to the widget object during the time interval where the synchronization is occurring may be ignored.

In examples, once the widget data structure 184 is changed or modified on one of the computing devices 10, 12, the widget runtime component 180 utilizes the synchronization logic 188 to stream widget synchronization data 187 to the network computing device 150. Depending on the implementation, the widget synchronization data 187 includes (i) the current widget data structure 184 (e.g., WDS2), which can include a widget DOM and associated metadata set; or (ii) the difference between the current and prior widget data structures (e.g., WDS2−WDS1). In this way, examples provide for the WPL 182 to be executed transactionally on the computing device 10, 12 where widget input is received, with synchronization operations being used to update the widget object 185 and metadata set 184 on the other computing devices 10, 12.

On the network computing system 150, the widget handler 166 can receive the widget synchronization data 187 from any of the computing devices 10, 12 on which the user interaction occurred. When non-simultaneous updates is received, the widget handler 166 can update the network-side widget data structure 194. As an addition or alternative, the widget handler 166 transmits service-side synchronization data 189 that includes the updated widget data structure 184. Depending on implementation, the service-side synchronization data 189 includes (i) the updated widget data structure 184 (e.g., widget DOM and metadata set), which may be stored by the network computing device 150 as the current widget data structure; (ii) a difference between the most recently received updated widget data structure 184 and the current widget data structure; or (iii) change data 121 representing the change to the content data representation 161, 171 which includes changes to the widget data structure 184.

When simultaneous updates are received, the network computing device 150 merges the widget synchronization data 187 from each input, such that the service-side synchronization data 189 includes merged widget synchronization data 187. The service component 160 can utilize one or more processes to merge widget synchronization data 187. For example, the service component 160 can update a local widget data structure 194 based on metadata included with the widget synchronization data 187 received from each of the computing devices 10, 12. The network widget synchronization data 167 can be transmitted to the computing devices 10, 12, as described above and with other examples.

Undo and Redo Actions

In some examples, the IAP 100 associates a data stack with the canvas 122. The data stack can be implemented as a data structure (e.g., table) that records metadata (values of widget state), reflecting the state change caused by individual interactions of each user. For each user interaction, stack includes an entry (e.g., row) that identifies the current state of the widget, the state change caused by the user action, and the inverse of the state change (or inverse state change) caused by the user. When implemented for a collaborative environment, each stack entry also identifies the most recent state change (or state contribution) of each user, and the inverse of that state change (or inverse state contribution). Thus, each stack entry can identify the widget state, each user's interaction that contributed to the widget state, and the inverse state change for each user.

When the user performs an undo action, the current state of the widget is identified, and the inverse state change for the user is applied. The state of the widget is then changed, to undo the user interaction. For example, in a scenario where the widget corresponds to a voting widget which receives user input as votes and displays an ongoing tall of votes user voted, the user interaction may increment the tally by 1. To illustrate, the user may interact with the widget object 185 to vote, causing the tally of the widget object to increment from 4 to 5. In one scenario, where the user performs an undo action, the tally changes the state (and displayed value) of the voting widget back to "4". Depending on implementation, the widget runtime component 180 (or widget handler 166 or other component of IAP 100) references the data stack and identifies the inverse state action for the given user, based on the current state of the voting widget. In some implementations, the widget data structure 184 is changed to reflect the state change resulting from the "undo" action, and the widget object 185 is re-rendered, as described with other examples.

To further the example of a collaborative environment, multiple users may vote before the user performs the undo action. For example, while the user's vote caused the stack to increment from 4 to 5, when the user performs the undo operation, the tally of the voter widget may be "8". The widget runtime component 180 can reference the data stack to identify the inverse state associated with the user's interaction and contribution to the current tally. Once the inverse state is identified and applied, the stack is updated to reflect the user has not provided an interaction that contributed to the current state of the widget object 185. Thus, the data stack entry may be updated to reflect the current state of the widget after the inverse state action is performed (e.g., tally is at "7"), and the state contribution of the given user may be a null set, with no inverse state contribution defined for that user. The inverse state may then be applied to change the state of the voting widget, from "8" to "7". In this way, the voting widget tracks the inverse state contribution from the individual users. The widget data structure 184 may be changed to reflect the "undo" action, and the widget object 185 may be re-rendered on the user computing device, as described with other examples. Further, the widget may be synchronized so that the state of the voting widget reflects on other computing devices reflects the user's "undo" action.

In examples, the data stack may also be further configured to include a redo state contribution, to reflect if the user performs a redo action. Thus, the data stack entry may reflect a current state of the widget, and for each user, the user's state contribution, the user's inverse contribution, and the user's redo contribution. If the user has made a state contribution (e.g., voted) but has not performed an "undo" action, the redo state action may be null. But when the user performs the "undo" action, the entry of the stack may reflect a redo contribution that is the inverse of the undo contribution. To perform a redo action, the data stack can be referenced again for the current state. For example, the same user may perform a redo action when additional votes are tallied, so that the tally is at "10". The entry of the data stack may reflect the user has not made a state contribution, with no undo contribution, but the redo contribution may reflect an increment of "1". When the redo action is performed, the widget runtime component 180 implements the state change to the widget data structure 184, the updated widget data structure is synchronized, and then used to re-render the updated widget component 185.

Methodology

Figure 2:
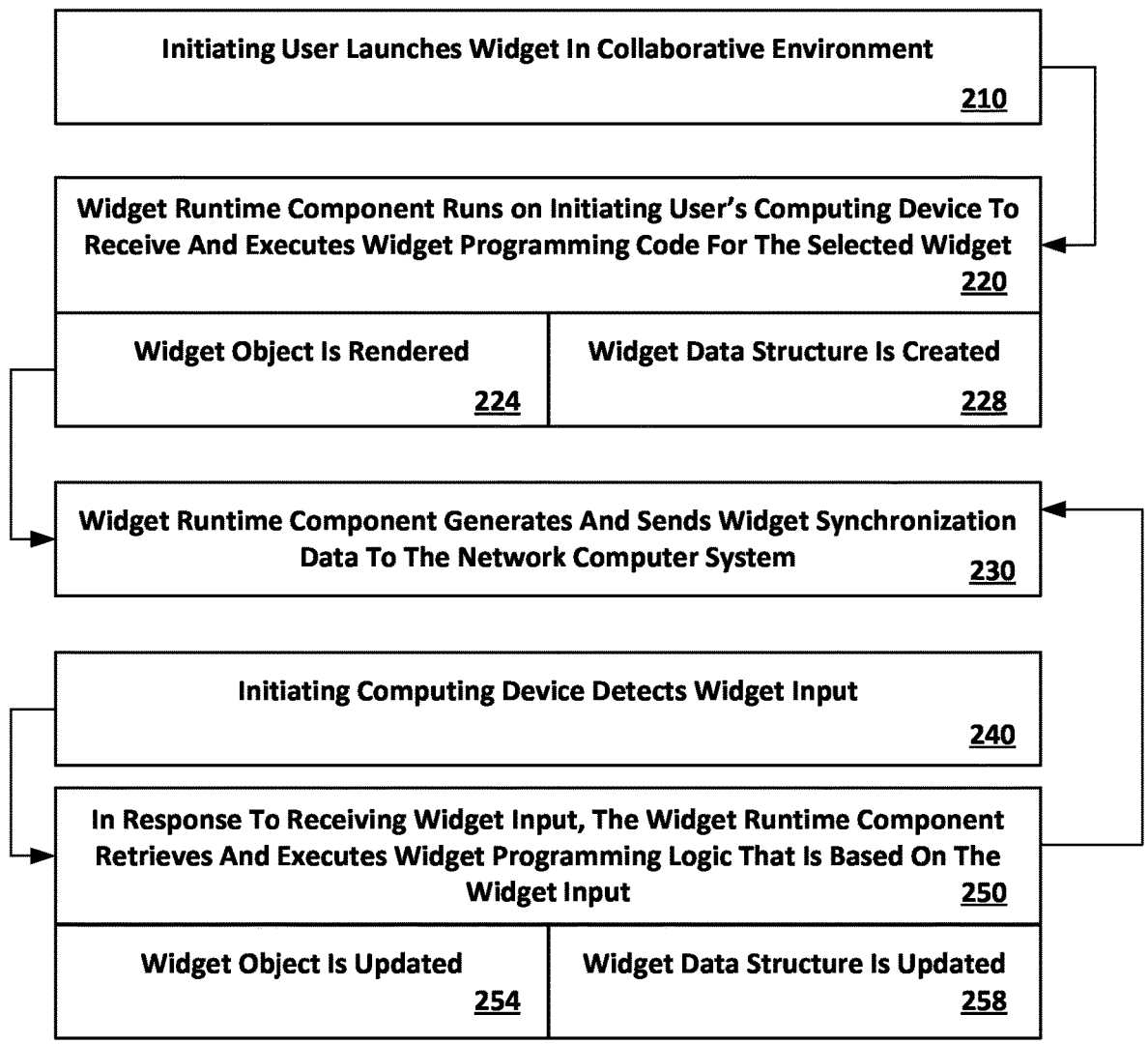
FIG. 2 illustrates an example method for implementing a widget with a canvas that is shared with multiple collaborating computing devices, according to one or more embodiments.
Figure 3:
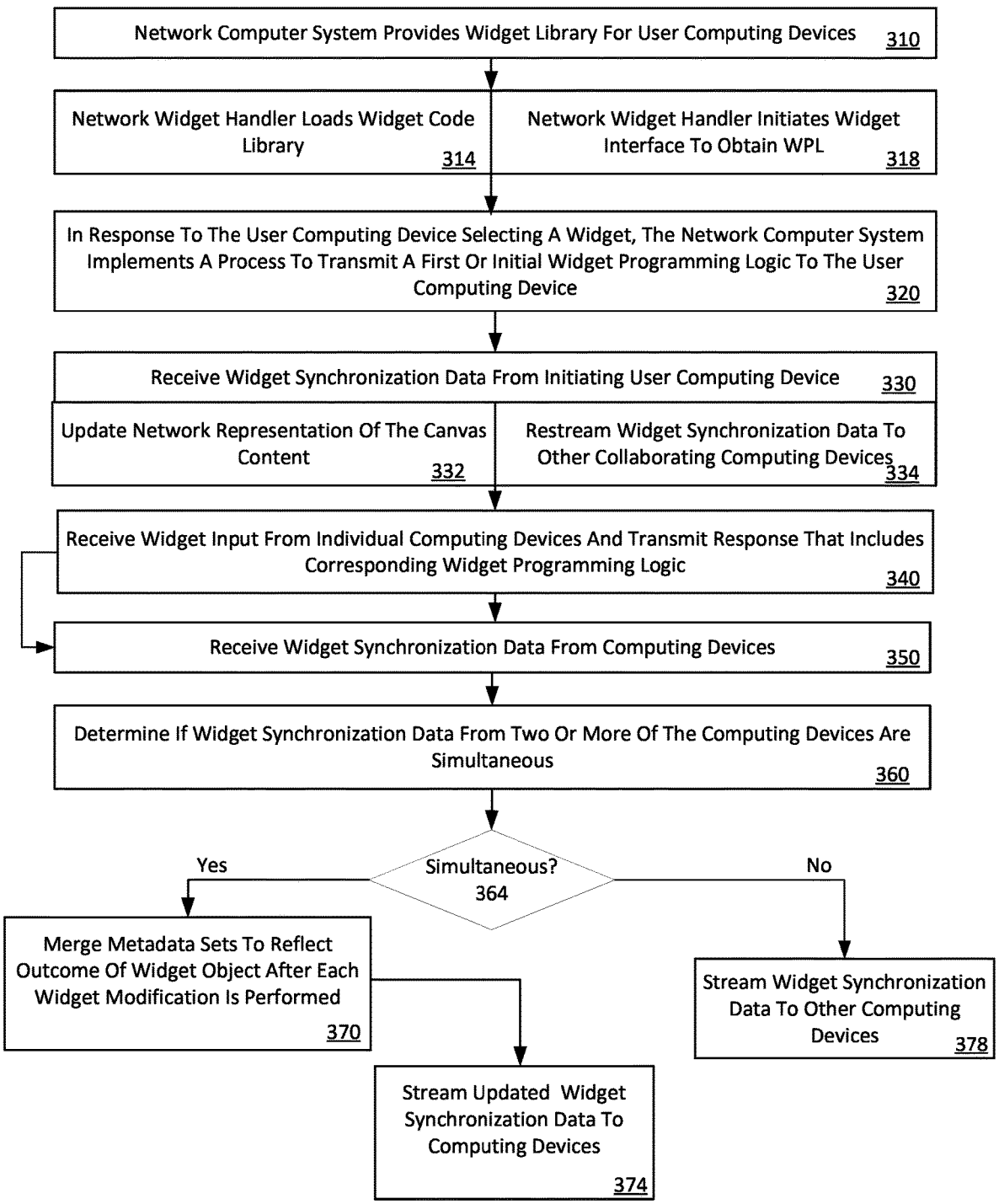
FIG. 3 illustrates an example method for operating a network computer system to enable a widget to be implemented for a canvas that is shared amongst multiple collaborating computing devices, according to one or more embodiments.
Figures 4A, 4B:
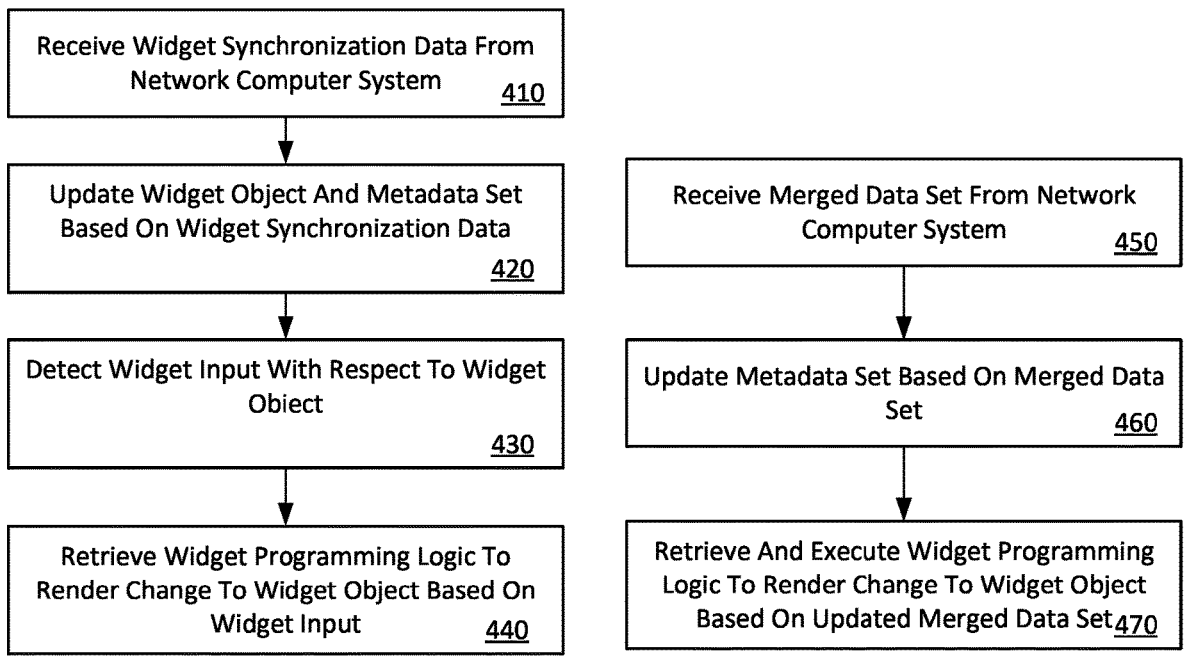
FIG. 4A and FIG. 4B illustrate example methods for operating a user computing device to update a widget object based on user input received on other computing devices, according to one or more embodiments.

FIG. 2 illustrates an example method for implementing a widget with content that is shared with multiple collaborating computing devices, according to one or more embodiments. FIG. 3 illustrates an example method for operating a network computer system to enable a widget to be implemented with content that is shared amongst multiple collaborating computing devices, according to one or more embodiments. FIG. 4A and FIG. 4B illustrate example methods for operating a user computing device to update a widget object based on user input received on other computing devices, according to one or more embodiments. In describing examples of FIG. 2 through FIG. 4B, reference may be made to elements of FIG. 1A and FIG. 1B for purpose of illustrating suitable functionality for performing a step or sub-step being described.

With reference to FIG. 2, multiple computing device 10, 12 can collaborate to create and update content (e.g., graphic design, whiteboard, presentation, etc.) on a shared canvas 122. Each computing device 10, 12 can have access to a widget library 190 as part of the network service 152. In such an environment, step 210 provides that a user ("initiating user") can provide input to select and launch a widget for use with the canvas 122.

In response to user input by the initiating user to launch the widget, step 220 provides that the widget runtime component 180 retrieves and executes WPL 182 on the computing device 10 of the initiating user. In examples, the WPL 182 is retrieved from the widget handler 166 of the network computer system 150. In step 224, the widget runtime component 180 can retrieve and execute, for example, a sequence of programmatic code, which results in a widget object 185 being rendered on the canvas 122. In step 228, the execution of the WPL 182 also causes the widget runtime component 180 to generate a widget data structure 184 that corresponds to the widget object 185, where the widget data structure 184 may include metadata that identifies the current state of the widget object 185. In some implementations, the data representation 184 can include a DOM representation of the widget object 185 (e.g., widget node). The widget data structure 184 can be integrated with the data structure representation 111 of the rendered content 125 on the canvas 122. For example, the widget DOM representation can be combined with a DOM representation of the rendered content 125.

In step 230, the widget runtime component 180 includes synchronization logic 188 to generate and send widget synchronization data 187 to the network computer system 150. In examples, the widget synchronization data 187 includes the widget data structure 184, which identifies a current state for the widget. After the widget is launched, the synchronization logic 188 can implement a process as described with other examples to stream the widget synchronization data 187 to the other computing devices 10, 12 that collaborate on the canvas 122. In examples, once the widget object 185 is initiated, the widget synchronization data 187 includes the widget data structure 184, which may include a widget DOM and/or a metadata set that identifies a current state of the widget object 185. Still further, in examples, the change data 121 that represents the content 125 in synch between computing devices 10, 12 can include widget synchronization data 187. Further, the local data structure representation 111 of the content 125 can be updated, so as to reflect the widget object 185 and the associated metadata set 184.

Subsequently, in step 240, the widget runtime component 180 runs on the initiating user computing device 10, 12 to detect user input that is intended as widget input. For example, the widget runtime component 180 can operate to detect user input that overlays and selects an interactive element of the widget object 185. As another example, the widget runtime component 180 can detect alphanumeric input that is received within a frame of the widget object 185.

In step 250, in response to detecting widget input, the widget runtime component 180 retrieves and executes the WPL 182 based on the detected widget input. For example, based on the attributes of the input, the widget runtime component 180 can identify, from the widget data structure 184, a function or other logic to retrieve and execute from the associated WPL 182 of the widget. In some examples, the widget runtime component 180 retrieves the WPL 182 by sending a communication that identifies the detected input and widget to the widget handler 166. Through execution of the WPL 182, in step 254, the widget object 185 is updated. As an addition or variation, in step 258, the data structure representation 184 of the widget is updated. In an example, a widget DOM representation and/or associated metadata set can be updated, meaning the local data structure representation 111 of the content 125 is updated to reflect the update to the widget object 185.

The widget runtime component 180 executes the synchronization logic 188 to stream widget synchronization data 187 to the service component 160, as described in step 230. Depending on the implementation, the widget synchronization data 187 includes (i) the current widget data structure 184, which can include a widget DOM and associated metadata set; or (ii) a difference between the current widget data structure 184 (after most recent user interaction) and the immediately prior widget data structure 184 (just prior to most recent user interaction). In this way, the widget synchronization data 187 can represent the change to the widget data structure 184. Still further, in some examples, the updated widget data structure 184 is integrated with the data representation 111 of the content 125, and the widget synchronization data 187 is communicated as, for example, change data 121, which includes changes to the content 125 as a result of the change caused by the rendering or update to the widget object 185.

With reference to FIG. 3, in step 310, the network computer system 150 operates to provide the widget library 190 for users of the network service 152. The widget library 190 can provide a collection of widgets, which can include executable program files that originate from third-party sources. Each widget can include resource files which provide a corresponding WPL 182 for implementing the widget on the canvas 122, as part of the content 125. In examples, the widget library 190 may store records that identify, describe and locate files and other resources of widgets. The widget library 190 can be provided with an interface to enable the user to browse and search records in order to select a widget for use with a content rendering.

A user operating a computing device 10, 12 can access the widget library 190 over a network to select a given widget. In examples, the service component 160 includes the widget handler 166 that responds to the user's widget selection input by accessing resources of the selected widget. In particular, in step 314, the widget handler 166 loads widget logic resources in, for example, a cache of the network computer system 150. The widget logic resources can include, for example, one or more files which identify units or segments of code, and where each unit or segment of code includes one or more lines of code that can be executed by the widget runtime component 180 of a given computing device to implement one or more actions of the selected widget. In examples, the one or more actions include generating a widget object 185 on the associated canvas 122, generating a widget data structure 184 of the widget object 185, and updating the widget data structure 184 and/or widget object 185.

As an addition or variation, in step 318, the widget handler 166 can implement a widget interface for a widget that has been launched for a particular canvas. The widget handler 166 can receive a communication corresponding to the widget input from the widget runtime component 180 of the user computing device 10, 12, parse the communication to identify the widget, query the widget interface with the widget input to receive WPL 182, and generate a response communication to the user computing device 10, 12 that includes select WPL 182. The WPL 182 of the response communication can be based at least in part on the widget input of the user. In this way, the selection logic of the widget determines how, for example, the widget object 185 is to change based on the user input, and WPL 182 for implementing the change is transmitted to the computing device 10, 12 from where the input was received.

In response to the computing device 10, 12 selecting a widget, in step 320, the network computer system implements a first or initial WPL 182 to the user computing device 10, 12. On the user computing device 10, 12 where the widget is selected ("initiating computing device"), the WPL 182 is executed to generate a widget object 185 and a corresponding set of metadata or widget data structure 184. In some implementations, the computing device 10, 12 can store a local copy of the WPL 182 received from the service component 160 for subsequent use for a given time interval (e.g., for a remainder of the session). The local copy of the WPL 182 can be stored in, for example, cache. In this way, the widget runtime component 180 can respond to subsequent widget input by retrieving the WPL 182 from cache.

In implementations where the user computing device 10, 12 is participating in a collaborative environment, the widget runtime component 180 executes synchronization logic 188 to generate widget synchronization data 187. In step 330, the service component 160 can operate to receive the widget synchronization data 187 from the initiating computing device 10, 12. In step 332, the service component 160 can parse the widget synchronization data 187 to update an internal representation of the content 125 as rendered on the canvas 122. Additionally, in step 334, the service component 160 can restream the widget synchronization data 187 to the other collaborating user computing devices 10, 12 that share the canvas 122 and content.

As described with other examples, each of the receiving user computing devices 10, 12 can include IAP 100 on which a corresponding widget runtime component 180 executes to receive the widget synchronization data 187. The respective widget runtime components 180 can each receive the widget synchronization data 187 to generate the widget object 185, along with the associated widget data structure 184 that identifies the state of the widget object 185. In this way, the service component 160 triggers the respective widget runtime components 180 to render the widget object in the same state as that of the initiating or modifying computing device 10, 12, without the other computing devices having to execute WPL 182 to generate the widget object 185. Thus, the service component 160 can send the widget synchronization data 187 to the other user computing device 10, 12, without providing the other computing devices with WPL 182 for recreating the widget object 185. Likewise, the other computing devices 10, 12 can recreate the widget object 185 by integrating the widget data structure 184 into the data representation of the content 125.

Once the widget is implemented for the collaborators, any of the users can interact with the widget. Widget input can be received by the service component 160 from any of the collaborating user computing devices 10, 12, and in step 340, the service component 160 can transmit a response that includes WPL 182 back to each of the respective user computing devices.

On each computing device 10, 12 where the WPL 182 is executed, the widget runtime component 180 to generate corresponding widget synchronization data 187, which identifies a modification made to the rendering of the widget object 185 on that computing device, as well as the widget data structure 184 associated with the modified widget object. In step 350, the service component 160 of the network computer system 150 can receive the widget synchronization data 187 from each of the respective user computing devices (350).

In step 360, the widget handler 166 performs a check to determine whether the widget synchronization data 187 from two or more of the collaborating computer devices are simultaneous. For example, the check can confirm that the transmissions from two or more computing devices is simultaneous if the (i) the widget synchronization data 187 from each computing device 10, 12 is received at about the same time (e.g., within a threshold time interval such as 100 ms), and (ii) on each of the two computing devices, the widget data structure 184 included with the widget synchronization data 187 does not reflect a change to the widget object 185 based on widget input received on the other computing device.

If in step 364, the determination is that widget synchronization data received from one or more collaborating computing devices 10, 12 is not simultaneous, then in step 378, the network widget synchronization data 167, which is based on the received widget synchronization data 187, is streamed to the other collaborating user computing devices 10, 12. As described with other examples, the network widget synchronization data 167 can include (i) a widget data structure 184 of the widget in its most recent state, (ii) a difference between the most recent widget data representation 184 and a prior widget data structure, and/or (iii) change data 121, representing the change in the content data 125, which may include the change represented by the addition of the widget object 185 or the state of the widget object 185.

If in step 364, the determination is that the widget synchronization data 187 from two or more computing devices 10, 12 is simultaneous, then in step 370, the widget data structures 184 from each stream is merged to create a merged widget data structure and metadata set. The widget synchronization data 187 generated from each computing device 10, 12 is updated to include the merged widget data structure and metadata set, and in step 374, the merged widget data structure is streamed to each of the collaborating computing devices 10, 12. Since the portion of each widget synchronization data 187 that represents the change to the widget data structure 184 on the respective computing device 10, 12 may no longer match the merged data representation, the widget handler 166 can either (i) implement a process to determine the update to the widget data structure 184 and represent the update in the widget synchronization data 187 before sending the widget synchronization data 187 to each of the collaborating computing devices 10, 12; or (ii) remove the portion of the widget synchronization data 187 that represents the widget object, or include widget object data that is mismatched to the merged data representation, and allow for the widget runtime component 180 on each of the receiving user computing devices 10, 12 to refresh the rendering of the widget object based on the merged data representation and metadata set. In one example, the widget handler 166 can implement an instance of the widget runtime component 180 to execute, on the network computer system 150, the rendering logic of the WPL 182 to determine the update to the widget object based on the merged data representation and metadata set. Alternatively, as described with other examples, the widget runtime component 180 on each computing device 10, 12 can include logic to detect the mismatch between the rendered state of the widget object and the merged widget data structure and metadata set. The widget runtime component 180 on each computing device 10, 12 can retrieve rendering logic of the WPL 182, from local cache or the network computer system 150, to update the widget object 185 so that its state matches the merged data representation and metadata set.

With reference to examples of FIG. 4A and FIG. 4B, different processes can be used to render or update a widget object on a collaborating user computing device 10, 12. In a first process shown by an example of FIG. 4A, step 410 provides that the user computing device 10, 12 can receive widget synchronization data 187 from the widget handler 166 of the network computer system 150. As described with other examples, the widget synchronization data 187 can reflect changes to the widget object 185 which are made by user input on another one of the collaborating user computing devices 10, 12.

In step 420, the widget runtime component 180 can update the widget object 185 and the associated widget data structure 184 based on the widget synchronization data 187. Thus, a state of the widget object 185 may be changed, and the associated widget data structure 184 may represent the updated state for the widget object.

Subsequently, on the same user computing device 10, 12, in step 430, the widget runtime component 180 can detect user input with respect to the widget object 185. In step 440, the widget runtime component 180 can retrieve and execute WPL 182 for the widget, based on the widget input. For example, the widget runtime component 180 can retrieve the WPL 182 from the widget handler 166 of the network computer system 150. Alternatively, the widget runtime component 180 may have previously retrieved the WPL 182 from the network computer system 150, and a local copy of the WPL 182 may be stored in cache on the user computing device 10, 12.

In a second process shown by an example of FIG. 4B, step 450 provides that the user computing device 10, 12 can receive merged widget data structures and metadata set from the widget handler 166 of the network computer system 150. As described with other examples, the merged widget data structures 194 can be received on each collaborating computing device 10, 12 in response to the widget handler 166 receiving simultaneous widget synchronization data from two or more of the collaborating user computing devices 10, 12. In such case, each computing device 10, 12 of the collaborative environment can receive the merged data set 194.

In step 460, the merged widget data structures and metadata set 194 can be used to update the widget data structure 184 of each computing device 10, 12. When the merged widget data structures 194 are used to update the respective widget data structures 184 on the respective computing devices 10, 12, the state of the widget object may no longer match a state represented by the updated widget data structure 184. In step 470, when such a condition arises, the widget runtime component 180 executes WPL 182 to change the rendering of the widget object 185 to match the state represented by the updated widget data structure 184. The widget runtime component 180 can retrieve that what WPL 182 from a network resource (e.g., the widget handler 166) or a local resource (e.g. a local cache of the user computing device).

Example Widget Objects

FIG. 5A through FIG. 5D illustrate an example of an interactive widget component that is rendered on a canvas of a computing device, according to one or more embodiments. Examples such as described with FIG. 5A through FIG. 5D can be implemented using example systems such as described with FIG. 1A and FIG. 1B.

In an example shown by FIG. 5A through FIG. 5D, a canvas 510 renders content that includes a content element 512 and a widget component 520. The content rendered on canvas 510 can be generated by a user utilizing one or more application services on a computing device. For example, the content rendered on canvas 510 can be generated by implementation of a graphic design application service, a whiteboarding application service and/or other type of graphic/visual content creation application service. The content element 512 is an example of a graphic content element which can be created by such graphic/visual content creation application services. The content element 512 includes a frame, and a set of attributes (e.g., line characteristics, fill color, bound content element, textual characteristics, etc.).

In examples, the interactive widget object 520 is rendered on the canvas 510 as a persistent interactive content element. In embodiments, the specific functionality and configuration of the widget object is determined by programming, scripts, code and other logic that is associated with and specific to the widget object. Accordingly, in examples, the widget object 520 can be configured by widget programming logic to receive input within one or more defined regions that include or are based on a perimeter (e.g., frame) of the widget object.

In a collaborative environment, any of the users can create, manipulate and update the widget object 520. The widget component 520 can include a set of attributes (e.g., shape, fill color, line attribute), one or more sub elements 514 that is dynamic and responsive to user input to change state (e.g., display a count), and one or more interactive features 516, 518 that can receive user input. As described in greater detail, the widget object 520 can be associated with widget programming logic that determines the input feature 516, 518, and the functionality that is implemented responsive to user input or other events. The input region(s) of the widget object 520 can be determined by the associated widget programming logic. For example, the relative dimension, location, layout and functionality associated with a particular input region can be determined by the widget programming logic. As described with other examples, the widget programming logic can be implemented through, for example, an application program interface ("API") of the rendering engine 120 for the IAP 100. Further, the state of the widget object 520 can be determined or based on the state of the one or more sub-elements that are dynamic and responsive to user input.

The widget object 520 can be manipulated by input that is processed through, for example, rendering engine 120 of the IAP 100, to (i) reposition the widget object 520 on the canvas 510, (ii) resize the widget object 520, and/or (iii) change other attributes of the widget object, such as fill color, line attribute, etc. Additionally, the widget object 520 can use widget programming logic that is specific to the widget object 520, to receive and process widget input that updates a value or state of the widget component. In the example shown, the widget component 520 is a counter that increments or decrements a count in response to a corresponding positive or negative increment input. In a current state shown by FIG. 5A through FIG. 5C, the counter has a value of "4", while in FIG. 5D, the counter is shown to have a value of "5", responsive to another user input with the increment feature 518. When implemented for a collaborative environment, the widget object 520 is rendered in its synchronized state, where the state reflects the value of the sub-element. More generally, the current or synchronized state can represent a state of one or more content elements that are dynamic and responsive to input received in the collaborative environment.

In examples, the rendering engine 120 can also provide widget components with certain functionality and behavior, such as "sticky behavior". As illustrated by sequence represented by FIG. 5A through FIG. 5D, the rendering engine 120 can process input through a corresponding application service to enable the user to manipulate (e.g., move, reposition, etc.) each of the content element 512 and widget object 520 on the canvas 510, independent of one another (FIG. 5A). A user can further provide input to "stick" or attach the widget object 520 to the content element 512 by positioning the widget object to at least partially overlay or overlap with the content element 512 (FIG. 5B). Once stuck, the combined content elements can be moved or manipulated together about the canvas 510 (FIG. 5C). Further, the interactivity and functionality of the widget object 520 can remain while the widget object is combined with the other content element 512 (FIG. 5D).

Further, in some examples, when the content element 512 and the widget object 520 are stuck, one or both of the elements can change appearance so as to indicate the two objects can be moved or otherwise manipulated together. Additional rules or logic to govern the appearance or manipulability of the combined elements can be determined by rules, settings or other logic associated with the rendering engine 120 and/or widget programming logic.

It should be appreciated that the functionality of the widget object 520 and its configuration (e.g., type and location of input features 516, 518) are described for illustrative purposes of embodiments as described. By way of illustration, other examples of widget objects include a voting widget that enables users to vote on one or more choices, a visualization widget that is responsive to user input to generate interactive visualizations, a timeline our calendar widget that generates an interactive timeline or calendar object, and a game widget that provides interactive elements for providing a game (e.g., playing cards, checkerboard) on the canvas 510.

Network Computer System

Figure 6:
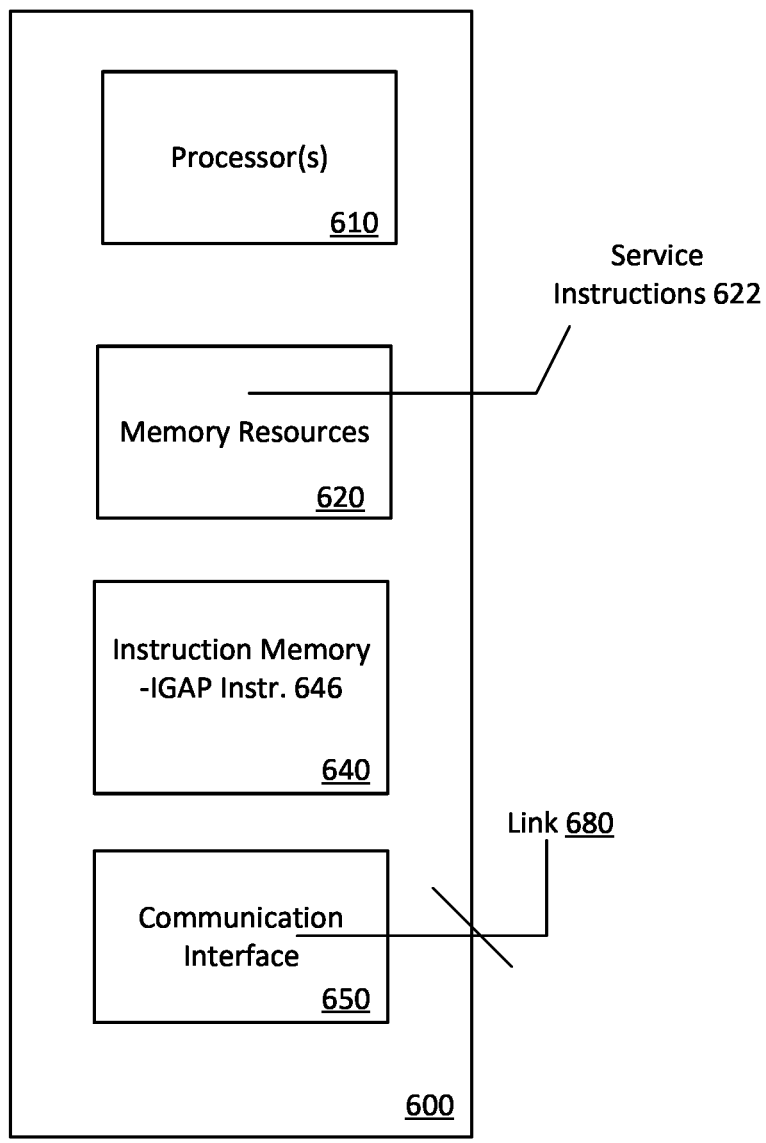
FIG. 6 illustrates a computer system on which one or more embodiments can be implemented.

FIG. 6 illustrates a computer system on which one or more embodiments can be implemented. A computer system 600 can be implemented on, for example, a server or combination of servers. For example, the computer system 600 may be implemented as the network computing system 150 of FIG. 1A and FIG. 1B.

In one implementation, the computer system 600 includes processing resources 610, memory resources 620 (e.g., read-only memory (ROM) or random-access memory (RAM)), one or more instruction memory resources 640, and a communication interface 650. The computer system 600 includes at least one processor 610 for processing information stored with the memory resources 620, such as provided by a random-access memory (RAM) or other dynamic storage device, for storing information and instructions which are executable by the processor 610. The memory resources 620 may also be used to store temporary variables or other intermediate information during execution of instructions to be executed by the processor 610.

The communication interface 650 enables the computer system 600 to communicate with one or more user computing devices, over one or more networks (e.g., cellular network) through use of the network link 680 (wireless or a wire). Using the network link 680, the computer system 600 can communicate with one or more computing devices, specialized devices and modules, and/or one or more servers.

In examples, the processor 610 may execute service instructions 622, stored with the memory resources 620, in order to enable the network computing system to implement the network service 152 and operate as the network computing system 150 in examples such as described with FIG. 1A and FIG. 1B.

The computer system 600 may also include additional memory resources ("instruction memory 640") for storing executable instruction sets ("IAP instructions 645") which are embedded with web-pages and other web resources, to enable user computing devices to implement functionality such as described with the IAP 100. In examples, the computer system 600 can communicate the IAP instructions 645 to computing devices of collaborators during a collaboration session.

As such, examples described herein are related to the use of the computer system 600 for implementing the techniques described herein. According to an aspect, techniques are performed by the computer system 600 in response to the processor 610 executing one or more sequences of one or more instructions contained in the memory 620. Such instructions may be read into the memory 620 from another machine-readable medium. Execution of the sequences of instructions contained in the memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

User Computing Device

Figure 7:
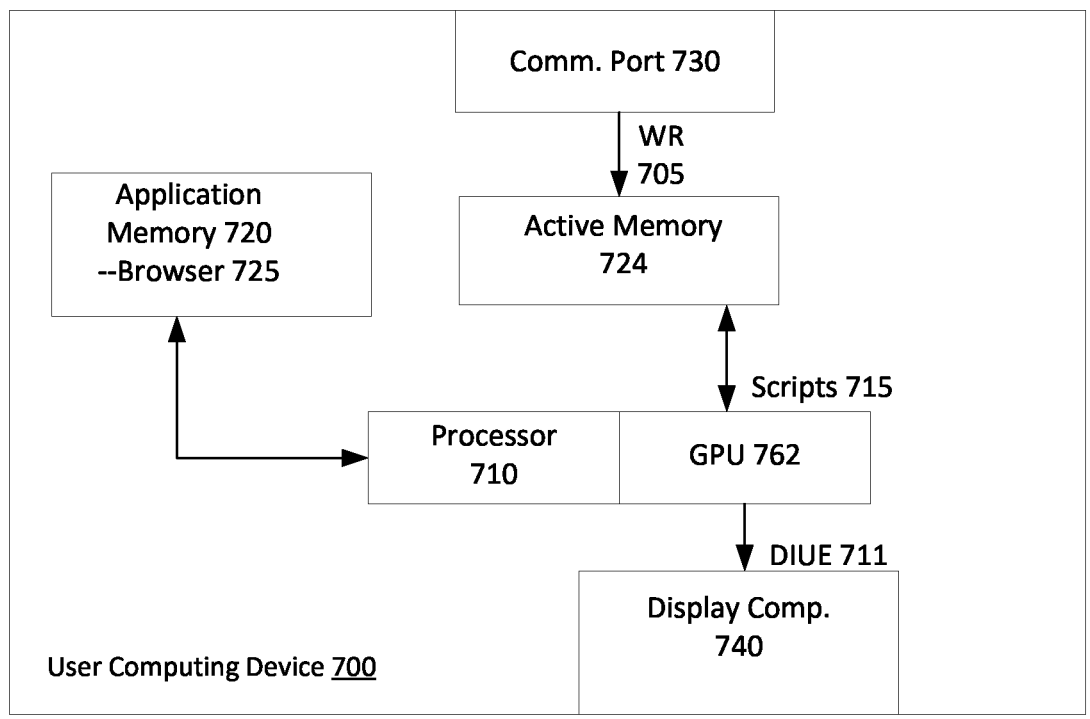
FIG. 7 illustrates a user computing device for use with one or more examples, as described.

FIG. 7 illustrates a user computing device for use with one or more examples, as described. In examples, a user computing device 700 can correspond to, for example, a work station, a desktop computer, a laptop or other computer system having graphics processing capabilities that are suitable for enabling renderings of design interfaces and graphic design work. In variations, the user computing device 700 can correspond to a mobile computing device, such as a smartphone, tablet computer, laptop computer, VR or AR headset device, and the like.

In examples, the computing device 700 includes a central or main processor 710, a graphics processing unit ("GPU") 712, memory resources 720, and one or more communication ports 730. The computing device 700 can use the main processor 710 and the memory resources 720 to store and launch a browser 725 or other web-based application. A user can operate the browser 725 to access a network site of the network service 152, using the communication port 730, where one or more web pages or other resources 705 for the network service 152 (see FIG. 1A and FIG. 1B) can be downloaded. The web resources 705 can be stored in the active memory 724 (cache).

As described by various examples, the processor 710 can detect and execute scripts and other logic which are embedded in the web resource in order to implement the IAP 100 (see FIG. 1A and FIG. 1B). In some of the examples, some of the scripts 715 which are embedded with the web resources 705 can include GPU accelerated logic that is executed directly by the GPU 712. The main processor 710 and the GPU can combine to render a workspace file, or design under edit ("DUE 711") on a display component 740. The rendered design interface can include web content from the browser 725, as well as design interface content and functional elements generated by scripts and other logic embedded with the web resource 705. By including scripts 715 that are directly executable on the GPU 712, the logic embedded with the web resource 705 can better execute the IAP 100, as described with various examples.

Conclusion

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:
   a memory sub-system storing a first set of instructions;
   one or more processors that operate to communicate instructions of the first set of instructions to a plurality of user computing devices, wherein the set of instructions include instructions that when executed by each user computing device of the plurality of user computing devices, causes each user computing device of the plurality of user computing devices to perform operations for implementing an integrated application platform to enable a corresponding user of that user computing device to collaborate on content rendered on a shared canvas;
   wherein for each user computing device of the plurality of user computing devices, implementing the integrated application platform includes:
      retrieving widget programming logic;
      executing the widget programming logic to (i) render a widget object as a persistent content element of the content rendered on the shared canvas; (ii) provide a widget data structure that identifies a state of the widget object; and (iii) in response to input from one of the users of the plurality of user computing devices that is directed to the widget object, change the state of the widget object and update rendering of the widget object on the shared canvas based on the changed state.

2. The network computer system of claim 1, wherein executing the widget programming logic includes (i) rendering the widget object to include a set of attributes that can be changed by input from one or more of the users of the plurality of user computing devices, and (ii) providing an interactive element with the widget object, the interactive element receiving input directed to changing the state of the widget object.

3. The network computer system of claim 1, wherein the widget programming logic is retrieved from the network computer system.

4. The network computer system of claim 1, wherein the widget programming logic is retrieved from a local cache.

5. The network computer system of claim 1, wherein the memory sub-system includes a second set of instructions, the second set of instructions being executable by one or more processors of the network computer system to perform operations that include:

receiving data from one of the plurality of user computing devices, the data indicating input to change the state of the widget object; and in response to receiving the data, performing a synchronization operation to cause at least one user computing device of the plurality of user computing devices to change the state of that widget object on that user computing device.

6. The network computer system of claim 5, wherein the operations further comprise:

receiving input directed to changing the state of the widget object, and in response to receiving the input, sending data reflecting the changed state to the network computer system.

7. A method for operating a user computing device, the method comprising:

implementing an integrated application platform to enable a corresponding user to collaborate, as part of a group of users operating a plurality of user computing devices, on content rendered on a shared canvas;

retrieving widget programming logic;

executing the widget programming logic to (i) render a widget object as a persistent content element of the content rendered on the shared canvas; (provide a widget data structure that identifies a state of a widget object; and (iii) in response to input directed to the widget object from one of the plurality of user computing devices, change the state of the widget object and update rendering of the widget object on the shared canvas based on the changed state.

8. The method of claim 7, wherein the widget data structure identifies functions that are associated with inputs directed to the widget object.

9. The method of claim 7, wherein the method further comprises: triggering each user computing device of the plurality of user computing devices to synchronize the widget data structure.

10. The method of claim 7, wherein executing the widget programming logic includes (i) rendering the widget object to include a set of attributes that can be changed by input from the one or more user computing devices, and (ii) providing an interactive element with the widget object, the interactive element receiving input directed to changing the state of the widget object.

11. A non-transitory computer-readable medium that stores instructions, which when executed by one or more processors of a first user computing device, cause the first user computing device to perform operations that include:

implementing an integrated application platform to enable a corresponding user to collaborate, as part of a group of users operating a plurality of user computing devices, on content rendered on a shared canvas;

retrieving widget programming logic;

executing the widget programming logic to (i) render a widget object as a persistent content element of the content rendered on the shared canvas; (ii) provide a widget data structure that identifies a state of a widget object; and (iii) in response to input directed to the widget object from one of the plurality of user computing devices, change the state of the widget object and update rendering of the widget object on the shared canvas based on the changed state.

12. The non-transitory computer-readable medium of claim 11, wherein the widget data structure identifies functions that are associated with inputs directed to the widget object.

13. The non-transitory computer-readable medium of claim 12, wherein the operations include: in response to receiving the input directed to the widget object, updating the widget data structure based on the functions identified in the widget data structure.

14. The non-transitory computer-readable medium of claim 11, wherein executing the widget programming logic includes (i) rendering the widget object to include a set of attributes that can be changed by input from one of the plurality of user computing devices, and (ii) providing an interactive element with the widget object, the interactive element receiving input directed to changing the state of the widget object.

15. The non-transitory computer-readable medium of claim 11, wherein the operations further comprise synchronizing the widget data structure amongst one or more of the plurality of user computing devices.

16. The non-transitory computer-readable medium of claim 11, wherein the widget programming logic is retrieved from a network computer system.

17. The non-transitory computer-readable medium of claim 11, wherein the widget programming logic is retrieved from a local cache.

18. The non-transitory computer-readable medium of 11, wherein the operations include:

receiving data indicating input to change the state of the widget object based on input received from one of the plurality of user computing devices; and in response to receiving the data, changing the state of the widget object based on the received data.

19. The non-transitory computer-readable medium of 11, wherein the operations further comprise:

receiving input directed to changing the state of the widget object, and in response to receiving the input, sending data reflecting the changed state to a network computer system.

* * * * *